United States Patent
Hagihara et al.

(10) Patent No.: US 8,924,953 B2
(45) Date of Patent: Dec. 30, 2014

(54) INFORMATION PROCESSING APPARATUS, AND INFORMATION PROCESSING METHOD AND PROGRAM

(75) Inventors: Shiro Hagihara, Kanagawa (JP); Masaki Hirose, Tokyo (JP); Shouji Nakamura, Kanagawa (JP)

(73) Assignee: Sony Corporation, Tokyo (JP)

(*) Notice: Subject to any disclaimer, the term of this patent is extended or adjusted under 35 U.S.C. 154(b) by 1311 days.

(21) Appl. No.: 11/504,245

(22) Filed: Aug. 15, 2006

(65) Prior Publication Data

US 2007/0169064 A1  Jul. 19, 2007

(30) Foreign Application Priority Data

Aug. 16, 2005  (JP) .................. 2005-235643

(51) Int. Cl.
G06F 9/445 (2006.01)
G06F 9/44 (2006.01)

(52) U.S. Cl.
CPC .................. G06F 9/4401 (2013.01)
USPC .................. 717/174; 717/168; 717/175

(58) Field of Classification Search
None
See application file for complete search history.

(56) References Cited

U.S. PATENT DOCUMENTS

| | | | | |
|---|---|---|---|---|
| 5,014,193 A | * | 5/1991 | Garner et al. | 710/10 |
| 5,247,683 A | * | 9/1993 | Holmes et al. | 709/221 |
| 5,329,471 A | * | 7/1994 | Swoboda et al. | 703/23 |
| 5,477,264 A | * | 12/1995 | Sarbadhikari et al. | 348/231.6 |
| 5,491,804 A | * | 2/1996 | Heath et al. | 710/7 |
| 5,603,031 A | * | 2/1997 | White et al. | 719/317 |
| 5,619,698 A | * | 4/1997 | Lillich et al. | 717/168 |
| 5,752,040 A | * | 5/1998 | Kaneko et al. | 717/170 |
| 5,787,246 A | * | 7/1998 | Lichtman et al. | 709/220 |
| 5,864,711 A | * | 1/1999 | Mairs et al. | 710/6 |
| 5,886,701 A | * | 3/1999 | Chauvin et al. | 345/418 |
| 5,892,953 A | * | 4/1999 | Bhagria et al. | 717/175 |

(Continued)

FOREIGN PATENT DOCUMENTS

| | | |
|---|---|---|
| JP | 2-153654 | 6/1990 |
| JP | 2004-348519 | 12/2004 |
| JP | 2005 11209 | 1/2005 |

OTHER PUBLICATIONS

Shahram Izadi et al., "The FUSE Platform: Supporting Ubiquitous Collaboration Within Diverse Mobile Environments", Kluwer Academic Publishers, 2002, <http://research.microsoft.com/pubs/132666/fulltext.pdf>, pp. 1-20.*

(Continued)

Primary Examiner — Thuy Dao
Assistant Examiner — Samuel Hayim
(74) Attorney, Agent, or Firm — Frommer Lawrence & Haug LLP; William S. Frommer

(57) ABSTRACT

An information processing apparatus includes a first loading unit that loads a general-purpose software which provides a general-purpose function to an execution environmental area and mounts the general-purpose software in a predetermined directory at the time of starting up a system. A second loading unit loads a dedicated software which provides a function intrinsic to the other device to the execution environmental area and mounts the dedicated software in a predetermined directory at the time of starting up a system. An integrating unit integrates a first setting file containing general-purpose setting information which is included in the general-purpose software and a second setting file containing general-purpose setting information which is included in the dedicated software.

11 Claims, 25 Drawing Sheets

(56) References Cited

U.S. PATENT DOCUMENTS

| | | | |
|---|---|---|---|
| 5,909,559 A * | 6/1999 | So | 710/307 |
| 5,944,779 A * | 8/1999 | Blum | 709/201 |
| 5,978,829 A * | 11/1999 | Chung et al. | 718/102 |
| 6,003,065 A * | 12/1999 | Yan et al. | 709/201 |
| 6,003,093 A * | 12/1999 | Kester | 719/321 |
| 6,055,363 A * | 4/2000 | Beals et al. | 717/174 |
| 6,070,012 A * | 5/2000 | Eitner et al. | 717/168 |
| 6,138,140 A * | 10/2000 | Yokote | 709/203 |
| 6,177,957 B1 * | 1/2001 | Anderson | 348/231.99 |
| 6,179,489 B1 * | 1/2001 | So et al. | 718/102 |
| 6,199,179 B1 * | 3/2001 | Kauffman et al. | 714/26 |
| 6,240,440 B1 * | 5/2001 | Kutcher | 718/102 |
| 6,327,613 B1 * | 12/2001 | Goshey et al. | 709/208 |
| 6,384,925 B1 * | 5/2002 | Fujiyoshi | 358/1.15 |
| 6,412,015 B1 * | 6/2002 | Navare et al. | 709/250 |
| 6,535,924 B1 * | 3/2003 | Kwok et al. | 709/242 |
| 6,539,433 B1 * | 3/2003 | Tominaga et al. | 709/246 |
| 6,553,414 B1 * | 4/2003 | Kakimoto et al. | 709/220 |
| 6,556,875 B1 * | 4/2003 | Nagasaka et al. | 700/19 |
| 6,668,070 B2 * | 12/2003 | Kondo et al. | 382/107 |
| 6,754,723 B2 * | 6/2004 | Kato | 710/8 |
| 6,854,121 B2 * | 2/2005 | Barnard et al. | 719/315 |
| 6,963,698 B2 * | 11/2005 | Kondo | 399/8 |
| 7,346,904 B2 * | 3/2008 | Fisher et al. | 717/175 |
| 7,360,212 B2 * | 4/2008 | Blake et al. | 717/175 |
| 7,386,546 B1 * | 6/2008 | Santry et al. | 1/1 |
| 7,831,752 B2 * | 11/2010 | Illowsky et al. | 710/62 |
| 2003/0135851 A1 * | 7/2003 | Dickey et al. | 717/168 |
| 2004/0015579 A1 * | 1/2004 | Cooper et al. | 709/223 |
| 2004/0143831 A1 * | 7/2004 | de Jong | 717/174 |
| 2004/0163081 A1 * | 8/2004 | Martwick | 717/168 |
| 2004/0181790 A1 * | 9/2004 | Herrick | 717/168 |
| 2004/0194083 A1 * | 9/2004 | Hindle et al. | 717/174 |
| 2004/0243992 A1 * | 12/2004 | Gustafson et al. | 717/168 |
| 2004/0243994 A1 * | 12/2004 | Nasu | 717/171 |
| 2004/0255286 A1 * | 12/2004 | Rothman et al. | 717/168 |
| 2005/0034121 A1 * | 2/2005 | Fisher et al. | 717/175 |
| 2005/0055688 A1 * | 3/2005 | Barajas et al. | 717/174 |
| 2005/0102439 A1 * | 5/2005 | Kondo | 710/5 |
| 2005/0102441 A1 * | 5/2005 | Yeh et al. | 710/8 |
| 2005/0108705 A1 * | 5/2005 | Koyama | 717/174 |
| 2005/0226170 A1 * | 10/2005 | Relan et al. | 370/254 |
| 2005/0289531 A1 * | 12/2005 | Illowsky et al. | 717/163 |
| 2006/0020910 A1 * | 1/2006 | Schlanger et al. | 717/101 |
| 2006/0041854 A1 * | 2/2006 | Schlanger et al. | 717/101 |
| 2006/0112416 A1 * | 5/2006 | Ohta et al. | 726/1 |
| 2006/0173980 A1 * | 8/2006 | Kobayashi et al. | 709/222 |
| 2006/0277542 A1 * | 12/2006 | Wipfel | 717/174 |
| 2007/0074003 A1 * | 3/2007 | Yim et al. | 712/24 |

OTHER PUBLICATIONS

Po-Chang Liu et al., "A Generic Software Framework for the Software System Architecture Design and Implementation of Handset Devices", IEEE, 2005, <http://ieeexplore.ieee.org/stamp/stamp.jsp?tp=&arnumber=1515396>, pp. 1-6.*

David Linner et al., "SmartWare—Framework for Autonomic Application Services", ICST, 2008, <http://delivery.acm.org/10.1145/1490000/1487669/a17-linner.pdf>, pp. 1-7.*

* cited by examiner

FIG. 24

| 191 | pkgA-1.0 | pkgB-1.2 | pkgC-2.0 |
|---|---|---|---|
| MERGE COMMON FUNCTION SETTING | ON | ON | OFF |
| EXECUTE FIRST PRODUCT INTRINSIC START-UP PROCESSING PROCEDURE | ON | OFF | ON |
| EXECUTE SECOND PRODUCT INTRINSIC START-UP PROCESSING PROCEDURE | ON | OFF | ON |

INFORMATION PROCESSING APPARATUS, AND INFORMATION PROCESSING METHOD AND PROGRAM

CROSS REFERENCES TO RELATED APPLICATIONS

The invention contains subject matter related to Japanese Patent Application JP 2005-235643 filed in the Japanese Patent Office on Aug. 16, 2005, the entire contents of which being incorporated herein by reference.

BACKGROUND OF THE INVENTION

1. Field of the Invention

The invention relates to an information processing apparatus, an information processing method and an information processing program, and more particularly, to an information processing apparatus, an information processing method and an information processing program which more safely and easily enable addition, deletion and updating of functions.

2. Description of Related Art

In related art, as a method for updating software which is incorporated in a product later, there has been known a method in which the transfer of firmware is performed via a network such as Ethernet (trade mark), and the transferred firmware is recorded in a recording medium such as a flash memory or a hard disc (see J-P-A-2005-11209, for example).

In such a case, a program which performs the transfer of the firmware and a program which records the firmware in the recording medium is preliminarily incorporated in the product (at the time of shipment from a factory).

Here, along with the increase of volume of software which is incorporated in the product, an attempt has been made to use the software in common besides the use of hardware in common. For example, there has been known a method in which a general-purpose platform (constitution which includes general-purpose hardware and software) which installs software used in common by various products in a miniaturized CPU (Central Processing Unit) has been developed in common and the general-purpose platform is incorporated in various products thus realizing the reduction of the developing cost and the shortening of the development period of the hardware and software of the respective products.

A method for updating the above-mentioned software in a later stage (a software updating function) is requested by respective devices. Accordingly, to realize the reduction of developing cost and the shortening of the developing period on this software updating function, it is desirable to install the software updating function as a common software of the above-mentioned general-purpose platform.

That is, the respective products into which the general-purpose platform is incorporated have, in general, functions intrinsic to the products, and the general-purpose platform which provides the software updating function as the general-purpose function performs processing such as addition, deletion, updating and the like of the software intrinsic to the products for realizing the functions intrinsic to the products.

SUMMARY OF THE INVENTION

However, the general-purpose platform also includes system software which contains the above-mentioned software updating function and common functions of an operating system or the like. Accordingly, in performing processing such as addition, deletion and updating of the software intrinsic to products, it is necessary to perform not only such processing but also rewriting of system software containing common functions such as change of starting/end processing, change of setting on common functions, replacement of software modules having common functions or the like and hence, there exists a possibility that the system software becomes no more reparable by repeating the updating of software intrinsic to the products. Further, there also exists a possibility that the system software per se becomes inoperable due to a trouble during the updating operation of the software intrinsic to the products.

The invention has been made under such circumstances and enables an information processing apparatus and method and program to perform addition, deletion and updating of functions more safely and easily.

According to one embodiment of the invention, there is provided an information processing apparatus which is used while being incorporated in other device and provides a predetermined function to the other device in which the information processing apparatus is incorporated, wherein the information processing apparatus includes first loading means for loading a general-purpose software which provides a general-purpose function to an execution environmental area and mounts the general-purpose software in a predetermined directory at the time of starting up a system, second loading means for loading a dedicated software which provides a function intrinsic to the other device to the execution environmental area and mounts the dedicated software in a predetermined directory at the time of starting up a system, and integrating means for integrating a first setting file containing general-purpose setting information which is included in the general-purpose software which is loaded by the first loading means and a second setting file containing general-purpose setting information which is included in the dedicated software which is loaded by the second loading means and reflects the presence of the dedicated software.

The information processing apparatus may further include memory means for storing the general-purpose software and the dedicated software in a memory region which differs from the execution environmental area.

The memory means may store the general-purpose software and the dedicated software in memory regions which differ from each other.

The information processing apparatus further includes setting information memory means for storing setting information for setting a function of the dedicated software effective or ineffective, and the second loading means may, in the setting information stored in the setting information memory means, loads the dedicated software whose function is set to be effective to the execution environmental area and mounts the dedicated software in a predetermined directory.

The information processing apparatus may further include updating instruction acquisition means for acquiring updating instruction for updating a content of the setting information stored in the setting information memory means, and updating means for updating the content of the setting information based on the updating instruction acquired by the updating instruction acquisition means.

The setting information may allow the function to contain a list of the effective dedicated software.

The setting information may allow the function to contain table information indicative of setting for every start-up processing of the effective dedicated software.

The information processing apparatus may further include a command execution demand which executes a command contained in the dedicated software which is loaded and mounted by the second loading means at the time of starting the system.

According to another embodiment of the invention, there is provided an information processing method of an information processing apparatus which is used while being incorporated in other device and provides a predetermined function to the other device in which the information processing apparatus is incorporated, wherein the information processing method includes the steps of loading a general-purpose software which provides a general-purpose function to an execution environmental area and mounting the general-purpose software in a predetermined directory at the time of starting up a system, loading a dedicated software which provides a function intrinsic to the other device and mounting the dedicated software in a predetermined directory at the time of starting up the system, and integrating a first setting file containing general-purpose setting information which is included in the general-purpose software which is loaded by the first loading means and a second setting file containing general-purpose setting information which is included in the dedicated software which is loaded from the second loading means and reflects the presence of the dedicated software in the execution environmental area.

According to another embodiment of the invention, there is provided a program which allows a computer to perform processing which is used while being incorporated in other device and provides a predetermined function to other device in which the program is incorporated, wherein the program includes the steps of loading a general-purpose software which provides a general-purpose function to an execution environmental area and mounting the general-purpose software in a predetermined directory at the time of starting up a system, loading a dedicated software which provides a function intrinsic to the other device and mounting the dedicated software in a predetermined directory at the time of starting up a system, and integrating a first setting file containing general-purpose setting information which is included in the general-purpose software which is loaded by the first loading means and a second setting file containing general-purpose setting information which is included in the dedicated software which is loaded from the second loading means and reflects the presence of the dedicated software in the execution environmental area.

According to another embodiment of the invention, a general-purpose software which provides a general-purpose function is loaded to an execution environmental area and is mounted in a predetermined directory at the time of starting up a system, a dedicated software which provides a function intrinsic to the other device is loaded to the execution environmental area and is mounted in a predetermined directory at the time of starting up the system, and a first setting file containing general-purpose setting information which is included in the loaded general-purpose software and a second setting file containing general-purpose setting information which is included in the loaded dedicated software and reflects the presence of the dedicated software are integrated in the execution environmental area.

According to these embodiments of the invention, it is possible to process the information. Particularly, the invention can perform addition, deletion and updating of functions more safely and more easily.

BRIEF DESCRIPTION OF THE DRAWINGS

FIG. 24 is a schematic view showing a constitutional example of table information.

DESCRIPTION OF PREFERRED EMBODIMENTS

In describing embodiments of the invention hereinafter, the corresponding relationship between the invention described in the specification and the embodiments of the invention is explained as follows. This description is made to confirm that the embodiments which support the invention described in claims are described in this specification. Accordingly, although there may exist embodiments which are described in the embodiments of the invention but are not described in the specification as embodiments corresponding to the invention, it does not necessarily imply that the embodiments do not correspond to the invention. On the other hand, even the embodiments are described in this specification as the embodiments which correspond to the invention, it does not necessarily imply that the embodiments do not correspond to inventions other than the invention.

Further, the description of preferred embodiments does not imply all inventions described in this specification. In other words, this description does not deny the presence of the inventions which are described in this specification but are not claimed in this application, that is, the presence of the inventions which will become a subject of divisional applications or the invention which will be added by amendment in future.

Figure 4:
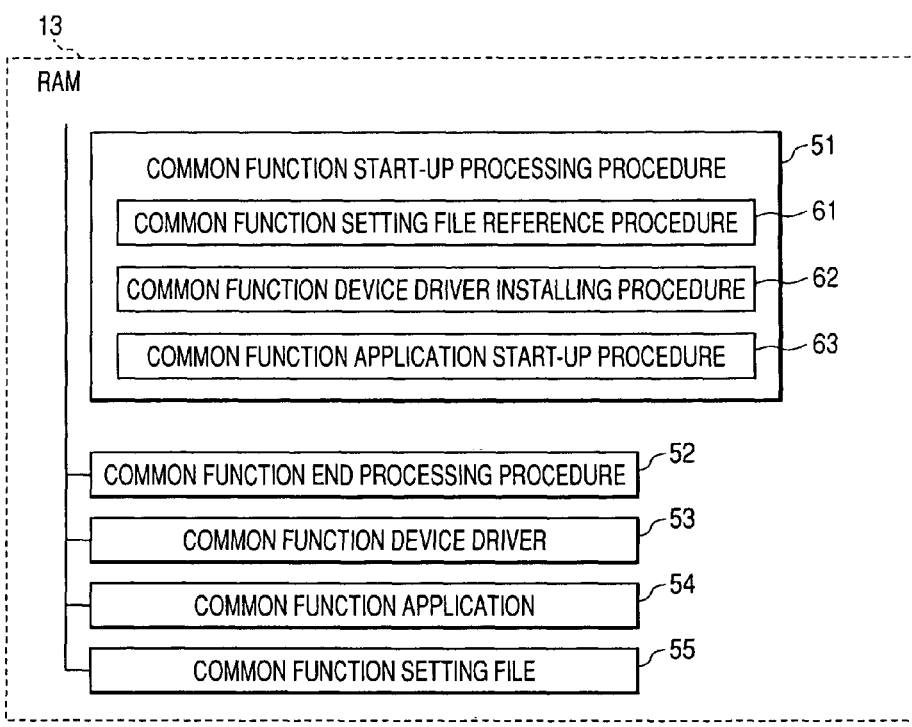
FIG. 4 is a view showing a constitutional example of software loaded in a RAM.
Figure 5:
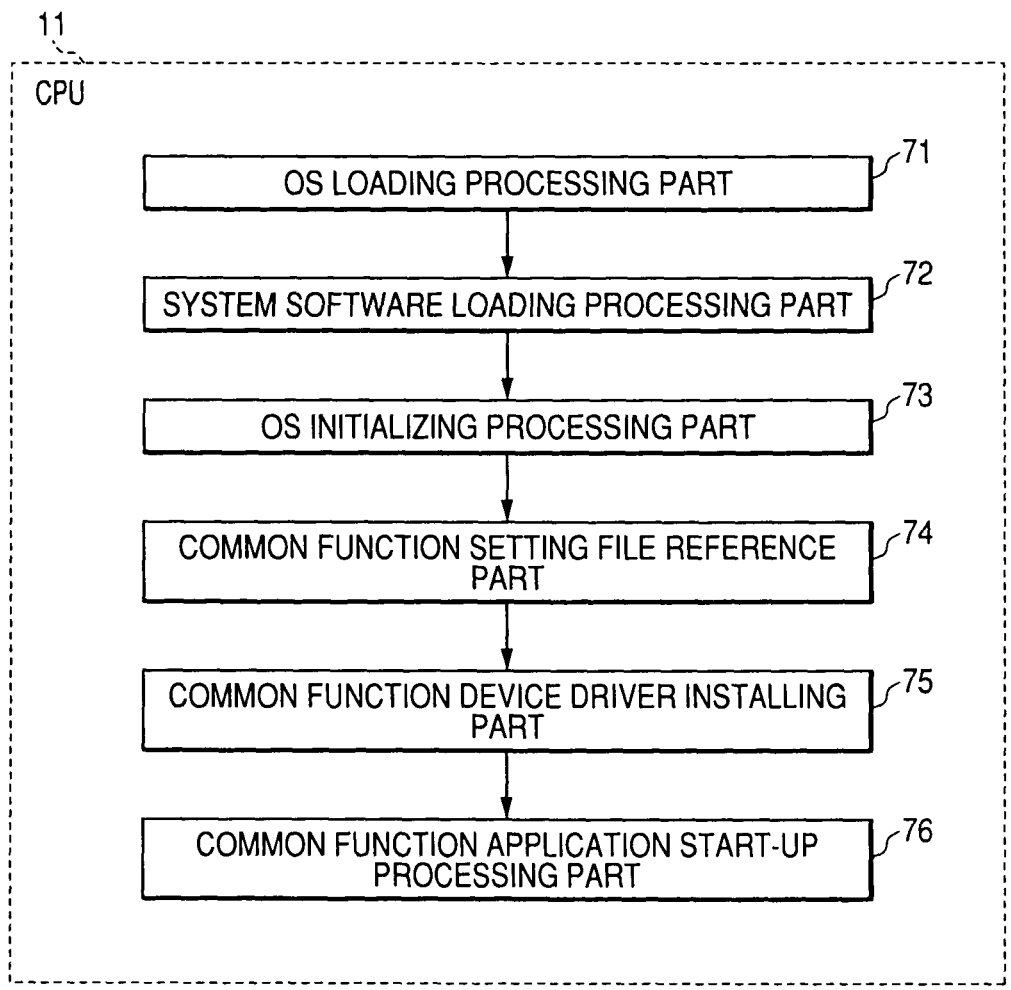
FIG. 5 is a functional block diagram showing the functions which a CPU has.
Figure 13:
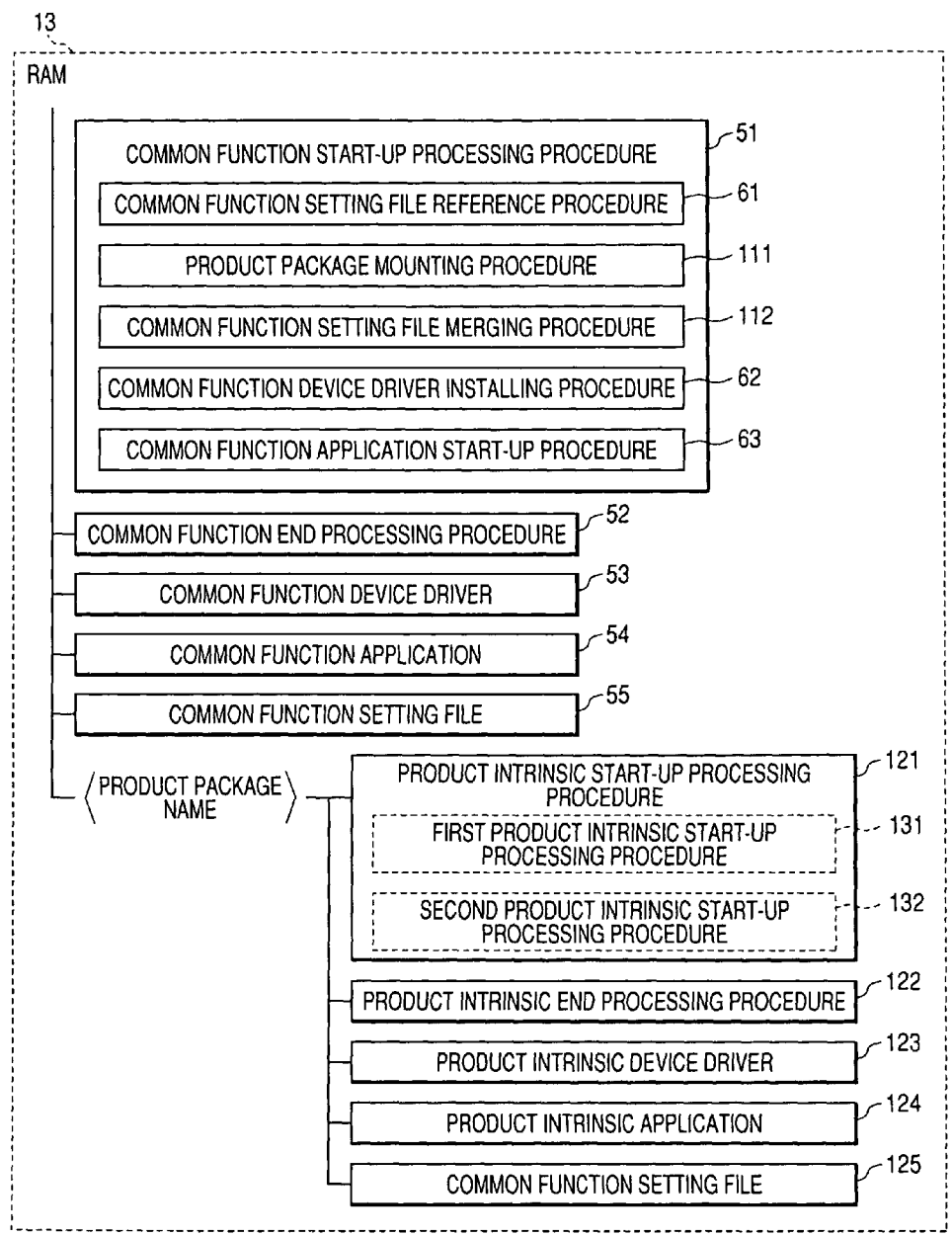
FIG. 13 is a view showing a constitutional example of software loaded in a RAM.
Figure 14:
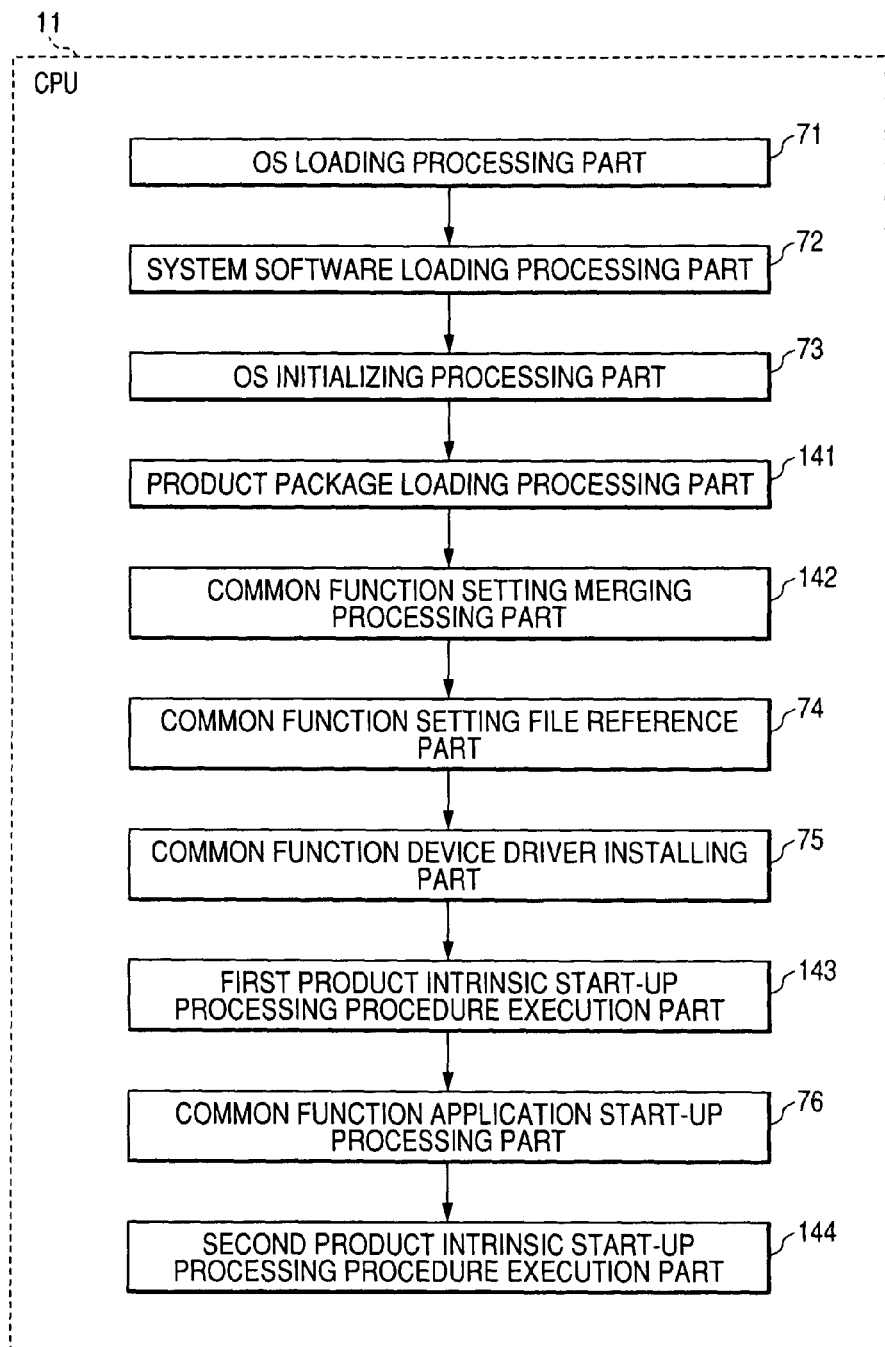
FIG. 14 is a functional block diagram showing the functions which a CPU has.

According to one embodiment of the invention, there is provided an information processing apparatus (for example, a general-purpose platform shown in FIG. 1) which is used while being incorporated in other device (for example, an image processing device shown in FIG. 2) and provides a predetermined function to the other device in which the information processing apparatus is incorporated, wherein the information processing apparatus includes first loading means (for example, a system software loading processing part and an OS initializing processing part shown in FIG. 5) for loading a general-purpose software (for example, a start-up processing procedure of a common function, an end processing procedure of the common function, a device driver of the common function, an application of the common function and a setting file on the common function in FIG. 4) which provides a general-purpose function to an execution environmental area (for example, a RAM shown in FIG. 1) and mounts the general-purpose software in a predetermined directory at the time of starting up a system, second loading means (for example, a product package loading processing part) for loading a dedicated software (for example, a start-up processing procedure intrinsic to products, an end processing procedure intrinsic to products, a device driver intrinsic to products, an application intrinsic to products and a setting file on the common function shown in FIG. 13) which provides a function intrinsic to the other device to the execution environmental area and mounts the dedicated software in a predetermined directory at the time of starting up a system, integrating means (for example, a common-function setting merging processing part shown in FIG. 14) for integrating a first setting file (for example, a setting file on the common function shown in FIG. 4) containing general-purpose setting information which is included in the general-purpose software which is loaded by the first loading means and a second setting file (for example, a setting file on the common function shown in FIG. 13) containing general-purpose setting information which is included in the dedicated software which is loaded by the second loading means and reflects the presence of the dedicated software in the execution environmental area.

The information processing apparatus may further include memory means (for example, a flash memory shown in FIG. 1) for storing the general-purpose software and the dedicated software in a memory region which differs from the execution environmental region.

Figure 3:
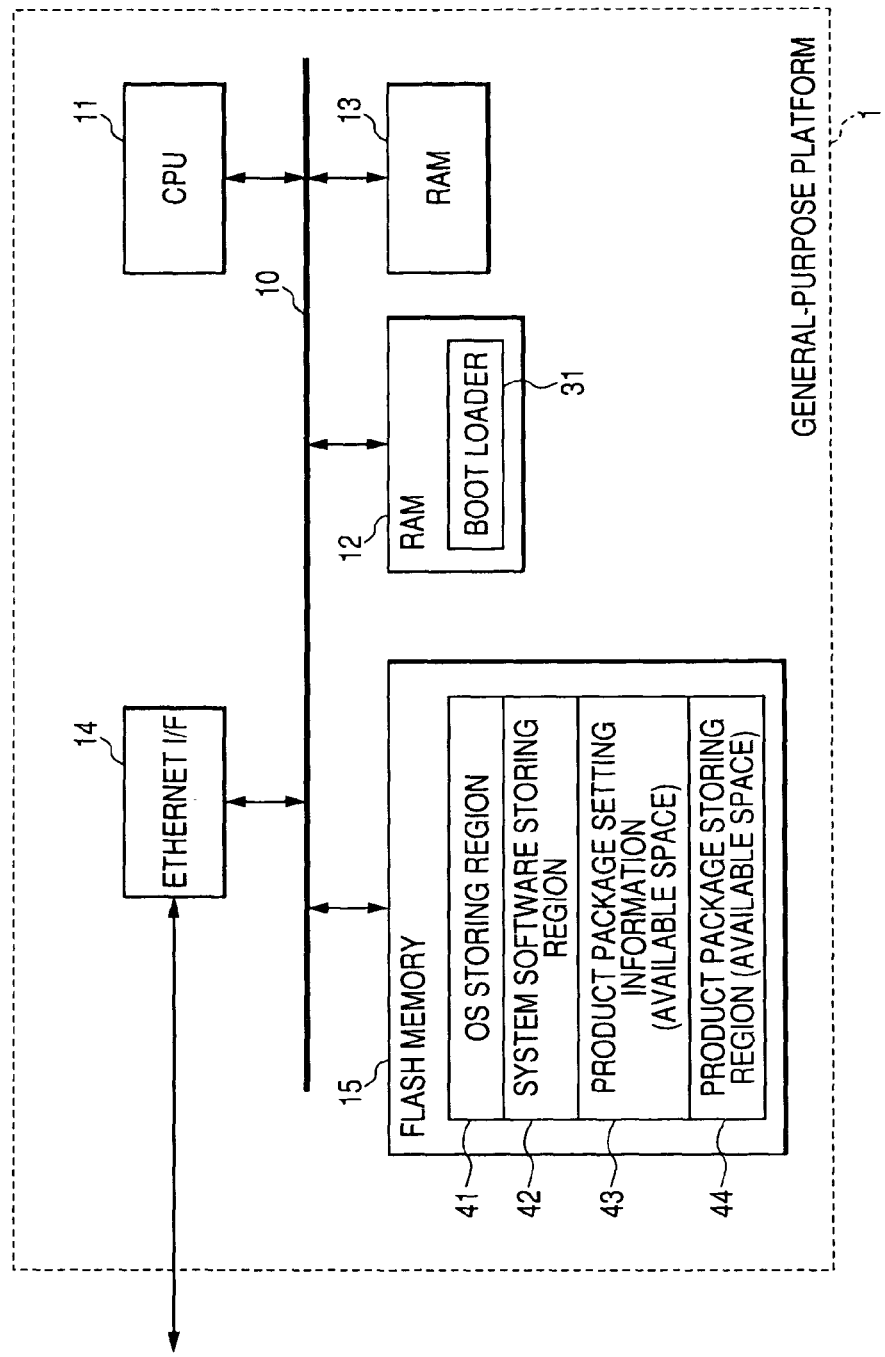
FIG. 3 is a is a view showing a constitutional example of a memory region of the general-purpose platform.

The memory means may store the general-purpose software and the dedicated software in memory regions (for example, a system software storing region and a product package storing region shown in FIG. 3) which differ from each other.

The information processing apparatus further includes setting information memory means (for example, product package setting information shown in FIG. 3) for storing setting information for setting a function of the dedicated software effective or ineffective, and the second loading means may, in the setting information stored in the setting information memory means, loads the dedicated software whose function is set to be effective to the execution environmental region and mounts the dedicated software in a predetermined directory.

Figure 18:
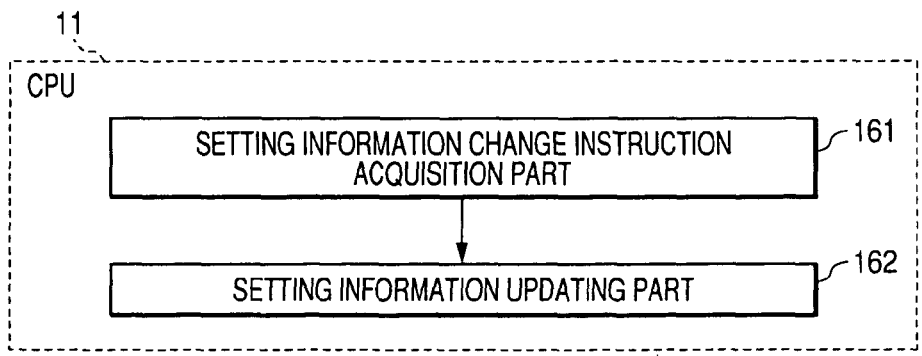
FIG. 18 is a functional block diagram showing the functions which a CPU has.

The information processing apparatus may further include updating instruction acquisition means (for example, an setting information changing instruction acquisition part shown in FIG. 18) for acquiring updating instruction for updating a content of the setting information stored in the setting information memory means, and updating means (for example, a setting information updating part shown in FIG. 18) for updating the content of the setting information based on the updating instruction acquired by the updating instruction acquisition means.

The setting information may allow the function to contain a list (for example, a list shown in FIG. 9) of the effective dedicated software.

The setting information may allow the function to contain table information (for example, table information shown in FIG. 24) indicative of setting for every start-up processing of the effective dedicated software.

Figure 21:
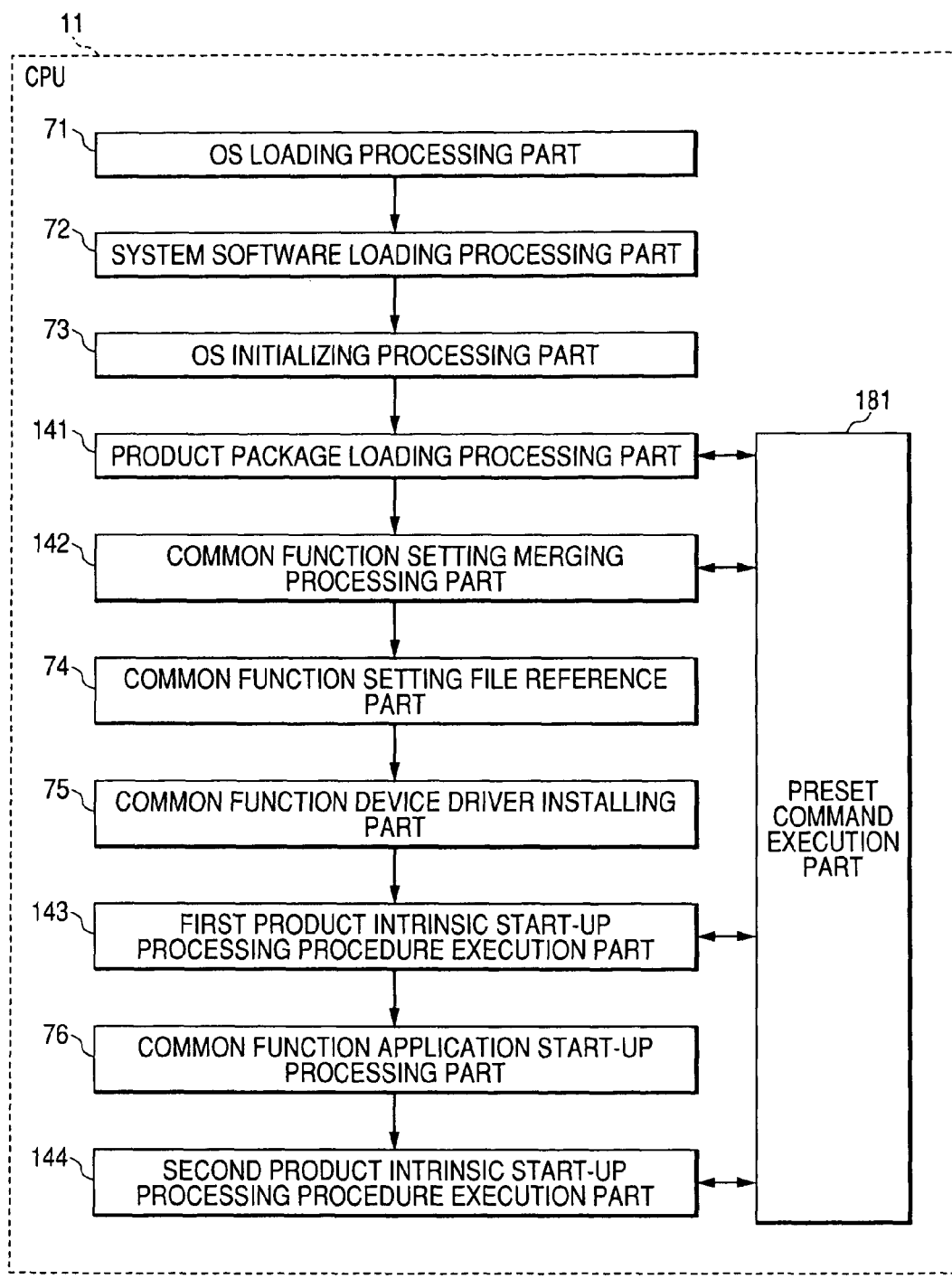
FIG. 21 is a functional block diagram showing the functions which a CUP has.

The information processing apparatus may further include command execution means (for example, a predetermined command execution part shown in FIG. 21) for executing a command contained in the dedicated software which is loaded and mounted by the second loading means at the time of starting the system.

Figure 15:
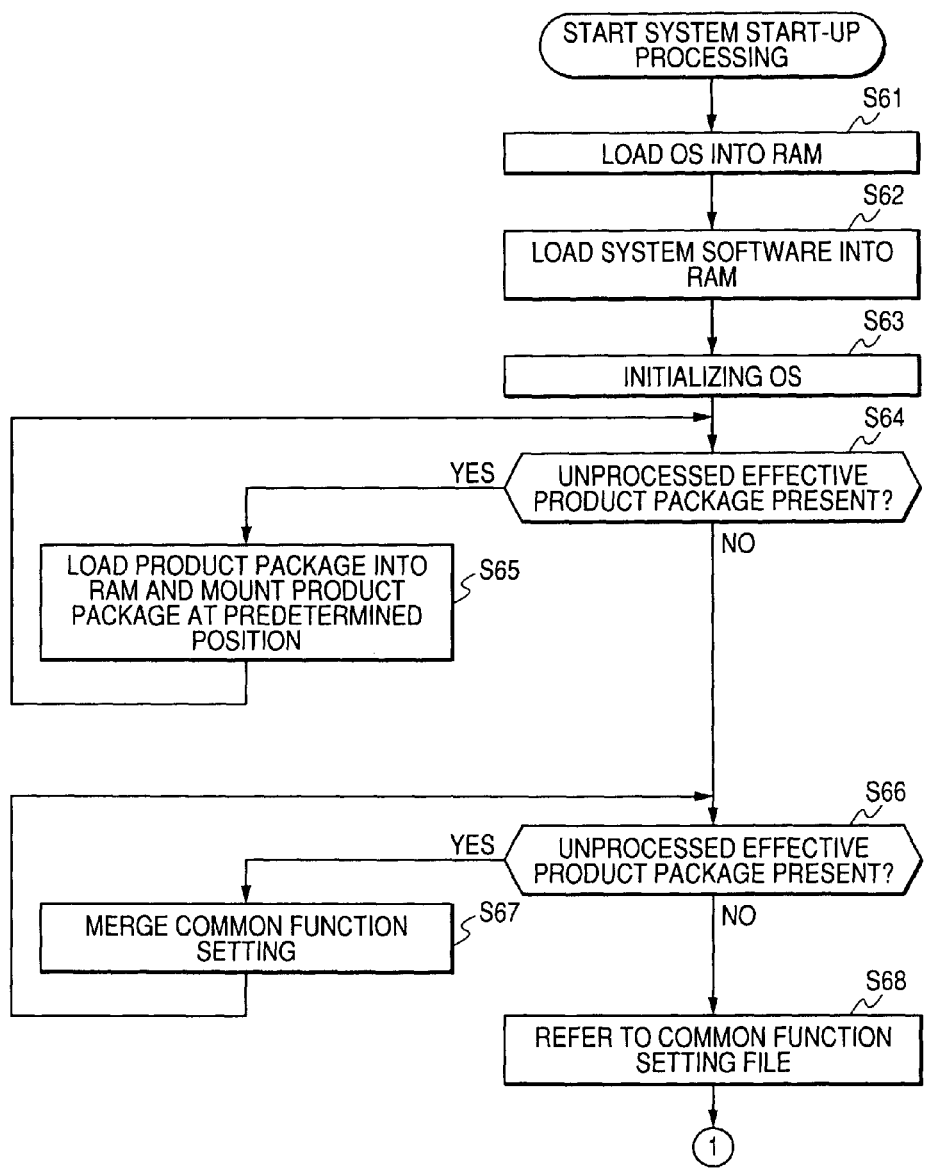
FIG. 15 is a flow chart for explaining an example of a flow of a system start-up processing.

According to one embodiment of the invention, there is provided an information processing method and a program which are used while being incorporated in other device (for example, an image processing device shown in FIG. 2) and is an information processing method of an information processing apparatus (for example, a general-purpose platform shown in FIG. 1) which provides a predetermined function to the other device in which the information processing apparatus is incorporated, wherein the information processing method and program include the steps of loading a general-purpose software (for example, start-up processing procedure of the common function, a end processing procedure of the common function, a device driver of the common function, an allocation of the common function and a setting file on the common function shown in FIG. 4) which provides a general-purpose function to an execution environmental region (for example, a RAM shown in FIG. 1) and mounting the general-purpose software in a predetermined directory (for example, step S2 shown in FIG. 6), mounting the general-purpose software in a predetermined directory (for example, step S3 shown in FIG. 6) at the time of starting up a system, loading a dedicated software (for example, a start-up processing procedure intrinsic to products, a end processing procedure intrinsic to products, a device driver intrinsic to products, an application intrinsic to products and a setting file on the common function shown in FIG. 13) which provides a function intrinsic to the other device to the execution environmental area and mounting the dedicated software in a predetermined directory (for example, step S66 shown in FIG. 15) at the time of starting up the system, and integrating a first setting file (for example, a setting file on the common function shown in FIG. 4) containing general-purpose setting information which is included in the general-purpose software which is loaded and a second setting file (for example, a setting file on the common function shown in FIG. 13) containing general-purpose setting information which is included in the dedicated software which is loaded and reflects the presence of the dedicated software in the execution environmental area (for example, step S68 shown in FIG. 15).

Hereinafter, an embodiment of the invention is explained in conjunction with drawings.

Figure 1:
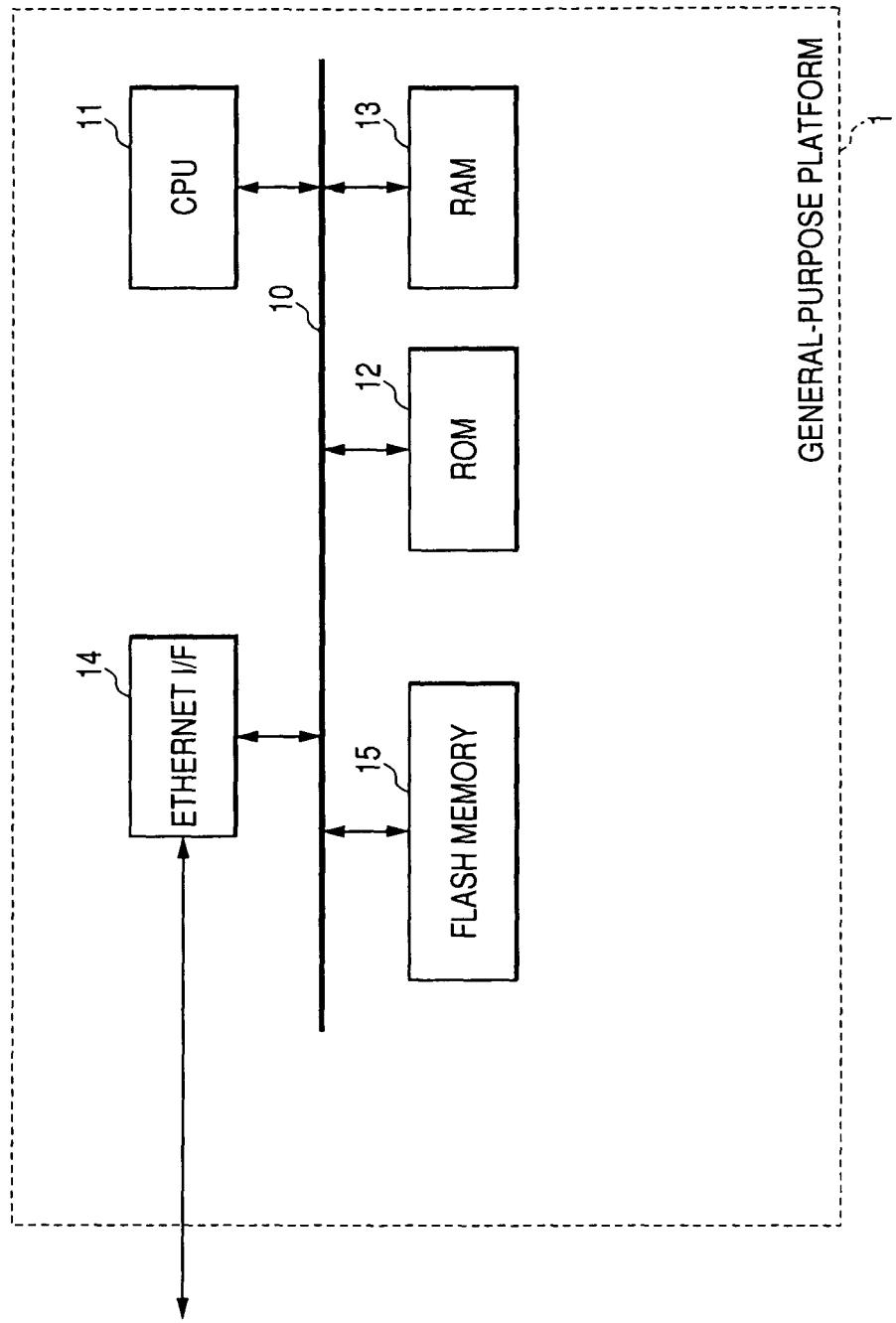
FIG. 1 is a view showing a constitutional example according to one embodiment of a general-purpose platform to which the invention is applied.

FIG. 1 is a view showing a constitutional example according to one embodiment of a general-purpose platform to which the invention is applied.

In FIG. 1, the general-purpose platform 1 is a unit which is used while being incorporated in a certain product. The platform 1 is constituted of general-purpose hardware and software, and, for example, is a platform which provides predetermined general-purpose functions such as a communication function, a control function and the like to the product. That is, the products in which the general-purpose platform 1 is incorporated have the same function even when the products are different devices from each other.

As shown in FIG. 1, the general-purpose platform 1 includes a CPU (Central Processing Unit) 11, a ROM (Read Only Memory) 12, a RAM (Random Access Memory) 13, an Ethernet (registered trademark) I/F (interface) 14, and a flash memory 15 which are connected to each other via a bus 10 therein.

The bus 10 is a bus of a predetermined standard such as PCI (Peripheral Components Interconnection) and transmits information which are supplied and received among the CPU 11, the ROM 12, the RAM 13, the Ethernet (registered trademark) I/F 14, and the flash memory 15. Further, the bus 10 is also connected with the constitution outside the general-purpose platform 1 (the constitution intrinsic to the products in which the general-purpose platform 1 is incorporated) and also transmits information which is supplied and received among the constitution intrinsic to the products and CPU 11, the ROM 12, the RAM 13, the Ethernet (registered trademark) I/F 14, and the flash memory 15. The CPU 11 is a processing part which controls operations of respective parts by executing a program or the like which is stored in the ROM 12 or the flash memory 15 and is loaded into the RAM, for example. The ROM 12 or the flash memory 15 is a non-volatile rewritable storage medium such as a flash memory, is constituted as a platform, and stores common software (program, data or the like) for providing functions common in products and dedicated software for providing functions intrinsic to products into which the software is incorporated.

The RAM 13 is a volatile storage medium which is constituted of a volatile semiconductor memory. For example, the RAM 13 temporarily holds software (program, data or the like) which is controlled by the CPU 11 and is read out from the ROM 12 or the flash memory 15 and provides holding information to the CPU 11 or the like when necessary. The Ethernet (registered trademark) I/F 14 performs the communication with an external device (a device which is connected with a product in which the general-purpose platform 1 is incorporated via a network such as the Ethernet (registered trademark) I/F or the Internet) and performs the supply and the reception of the information between the Ethernet (registered trademark) and the external device. For example, the Ethernet (registered trademark) I/F 14 acquires updating data of software stored in the flash memory 15 from the external device and makes the RAM 13 hold the updating data via the bus 10. The CPU 11 updates the software recorded in the ROM 12 using the updating data held by the RAM 13.

Here, although the general-purpose platform 1 may be formed of a physically single unit, the general-purpose platform 1 may be formed of a plurality of units. Provided that the relationship between the respective parts becomes substantially equal to the relationship of the respective parts of the constitution shown in FIG. 1, any physical constitution can be adopted. Further, the general-purpose platform 1 can provide not only one general-purpose function but also a plurality of general-purpose functions.

As a product in which the general-purpose platform 1 is incorporated, various electronic equipments such as electronic control devices which are incorporated in household electric appliances such as an AV equipment, a personal computer, a refrigerator, a washing machine or the like, a broadcasting facility, a device which constitutes a traffic administration system, an automobile or an airplane can be considered. That is, the general-purpose platform 1 may be incorporated into any product which performs a control or processing thereof using an electronic circuit.

Various methods are considered as a method for developing the general-purpose platform 1. Here, to limit the explanation on the invention, for the sake of convenience, in the development of the general-purpose platform 1, it is assumed that the constitution and functions (particularly functions intrinsic to the product) of the product to which the general-purpose platform 1 is incorporated are not specified.

That is, although the ROM 12 of the general-purpose platform 1 also stores the dedicated software for realizing the function intrinsic to the product to which the general-purpose platform 1 is incorporated, at the time of developing the general-purpose platform 1, only a memory region in which such software is stored is provided to the ROM 12 and the software per se is not developed (the dedicated software intrinsic to the product to which the general-purpose platform 1 is incorporated is developed at the time of developing the product).

Developers of the product in which the general-purpose platform 1 is incorporated can omit the development on the general-purpose functions of the general-purpose platform 1 by using the already-developed general-purpose platform 1 at the time of developing the product. That is, the developers of the product can realize the reduction of the development cost and the shortening of a development period by incorporating the general-purpose platform 1 into the product.

Here, it is needless to say that the developers of the general-purpose platform 1 and the developers of the product in which the general-purpose platform 1 is incorporated are the same. However, for facilitating the explanation of the invention, the explanation is made hereinafter assuming that the developers are different.

The dedicated software of the product in which the general-purpose platform 1 is incorporated may be stored in the ROM 12 at the time of shipment. However, the dedicated software may be stored in the ROM 12 via a network shown in FIG. 2 after the shipment of the product.

Figure 2:
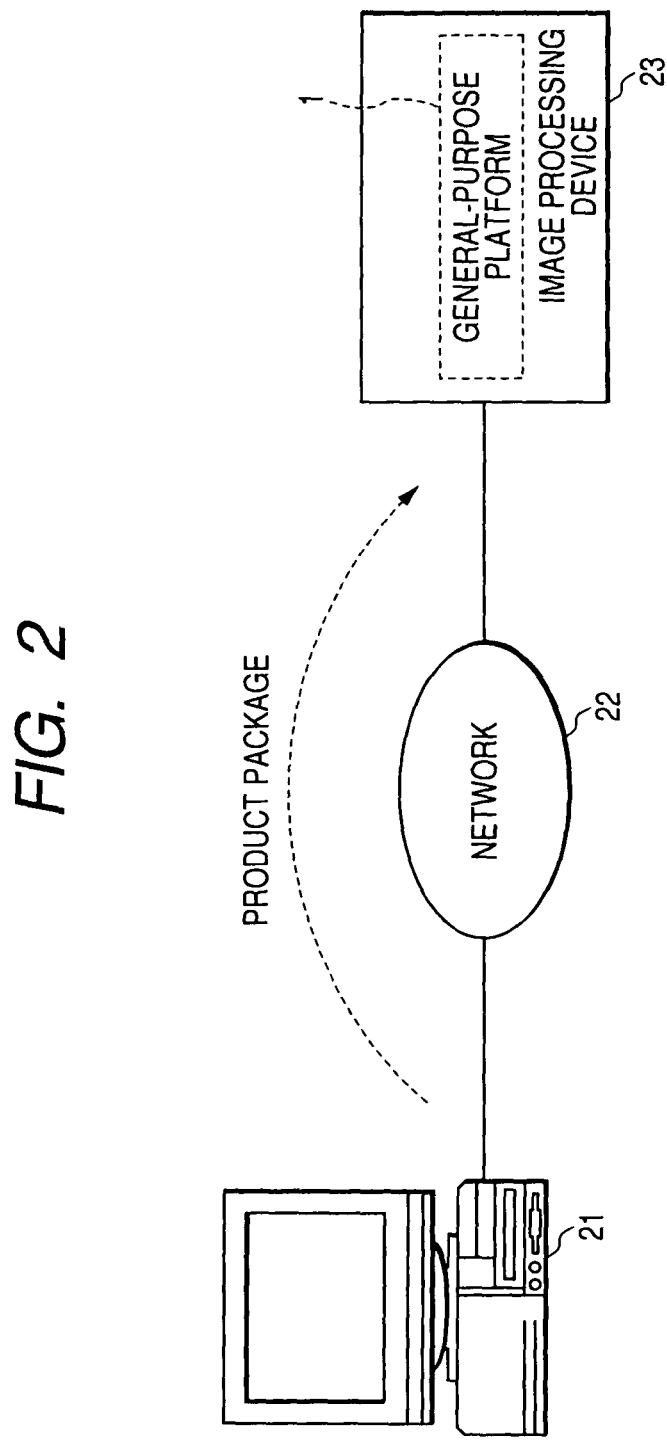
FIG. 2 is a view showing an example in which the general-purpose platform is applied to a system.

In FIG. 2, the general-purpose platform 1 is incorporated in an image processing device 23 which is connected with a personal computer 21 via a network 22. That is, the general-purpose platform 1 (Ethernet (registered trademark) I/F 14) is connected to the personal computer 21 via the network 22.

A group of dedicated software for realizing the function intrinsic to the image processing device is collectively gathered as a product package by the personal computer 21 and is supplied via the network 22. The general-purpose platform 1 acquires the product package supplied in this manner, and installs various dedicated software included in the product package.

Further, for example, the addition or the updating of the dedicated software which become necessary due to the addition or change of the functions may be performed via the network in the same manner as shown in FIG. 2.

Next, the memory region of the general-purpose platform 1 is explained. FIG. 3 is a view showing a constitutional example of the memory regions of the ROM 12 and the flash memory 15.

As shown in FIG. 3, in the ROM 12, a boot loader 31 which is a program executed firstly at the time of starting the system is stored. Further, the memory region of the flash memory 15 is divided into an OS (Operating System) storing region 41 in which an operating system such as Linux (trade mark) kernel or the like is stored, a system software storing region 42 in which system software including common functions which do not depend on products such as a Linux route file system or the like is stored, a product package storing information 43 which is setting information for changing over effective/ineffective of the product package, and a product package storing region 44 which stores the product package containing software having functions intrinsic to the product. Here, the OS storing region 41 and the system software storing region 42 may be formed in the memory region of the ROM 12.

The product package storing region 44 may store one or a plurality of product packages. Each product package is of an archive file type which contains a plurality of files. The file name of the archive file takes a form such as <package name>-<version number>. tar.gz". The product package setting information 43 stores a list of packages which are made effective out of the installed product packages. For example, to make a version 1.0 of the package A and a version 1.2 of the package B effective, the product package setting information 43 stores a list with vacant partition of "package A-1.0 package B-1.2".

Here, FIG. 3 shows the general-purpose platform 1 before installing the product package. In such a state, the boot loader 31 is installed in the ROM 12 and only the operating system and the system software are installed in the flash memory 15. Further, the product package setting information 43 and the product package storing region 44 constitute available spaces in which nothing is written.

Next, the explanation is made with respect to a case in which a system of the general-purpose platform 1 is started in this state (the state that the product package is not installed).

In a state shown in FIG. 3, when the system of the general-purpose platform 1 is started up, first of all, the execution control is transferred to the boot loader 31 stored in the ROM 12. That is, the CUP 11 reads out the boot loader 31 of the ROM 12, loads the boot loader 31 in the RAM 13 and executes the boot loader 31. The boot loader 31 which is executed by the CPU 11 reads out the operating system and the system software from the flash memory 15 and loads (copies) the operating system and the system software in the RAM 13.

FIG. 4 is a view showing the file constitution which the system software loaded in the RAM 13 contains. The system software includes a start-up processing procedure 51 which indicates the start-up processing of common functions not dependent on products, a end processing procedure 52 which indicates the end processing of the common functions indicative, a device drive 53 for the common functions, an application 54 for the common functions, a setting file 55 on the common functions and the like. The application 54 for the common functions includes, for example, applications for realizing a system logging function or a user account administrating function. Further, the device driver 53 for the common functions includes, for example, a driver which is necessary for reading out data stored in the flash memory 15 of the general-purpose platform 1 or for writing data in the flash memory 15.

Further, the start-up processing procedure 51 for the common functions includes a common-function setting file reference procedure 61 indicative of a reference procedure of the common-function setting file on 55, a common-function device driver installing procedure 62 indicative of an installing procedure of the device driver 53 for the common functions, and a common-function application start-up procedure 63 indicative of start-up procedure of the common-function application 54.

After loading the operating system and system software to the RAM 13, the boot loader 31 transfers the execution control to the operating system held in the RAM 13. That is, the CUP 11 finishes the execution of the boot loader 31 and starts the execution of the operating system.

The operating system which is executed by the CUP 11, after finishing the initializing processing thereof, starts the start-up processing of the whole system by reference to the start-up processing procedure 51 for the common functions contained in the system software. That is, the operating system transfers the execution control on the start-up processing to the start-up processing procedure 51 for the common functions.

The start-up processing procedure for the common functions 51 which is executed by the CUP 11 via the operating system refers to the common-function setting file 55 based on the common-function setting file reference procedure 61, installs the device driver 53 for the common functions based on the common-function device driver installing step 62, and starts up the application 54 for the common function based on the common-function application start-up procedure 63 thus making the common functions effective on the system.

Here, FIG. 5 shows a constitutional example of a functional block exhibiting functions which the CPU 11 acquires by executing software.

In FIG. 5, the CPU 11 has, as functional blocks, an OS loading processing part 71, a system-software loading processing part 72, an OS initializing processing part 73, a common-function setting file reference part 74, a common-function device driver installing part 75 and a common-function application start-up processing part 76.

The OS loading processing part 71 is a functional block showing a function which the CPU 11 acquires by executing the boot loader 31. The OS loading processing part 71 reads out an operating system which is stored in a storing region 41 of the flash memory 15, and loads the operating system into the RAM 13. When the loading of the operating system is finished, the OS loading processing part 71 transfers the processing to the system software loading processing part 72.

The system software loading processing part 72 is a functional block showing a function which the CPU 11 acquires by executing the boot loader 31. The system software loading processing part 72 reads out system-software stored in a system software storing region 42 of the flash memory 15, and loads the system software into the RAM 13. When the loading of the system software is finished, the system software loading processing part 72 transfers the processing to the OS initializing processing part 73.

The OS initializing processing part 73 is a functional block showing a function which the CPU 11 acquires by executing the operating system loaded into the RAM 13. The OS initializing processing part 73 initializes the operating system which is loaded into the RAM 13, and respective files of the system software are, for example as shown in FIG. 4, mounted in the predetermined directory of a file system. When the initializing is finished, the OS initializing processing part 73 transfers the processing to the common-function setting file reference part 74.

The common-function setting file reference part 74 constitutes a functional block showing a function which the CPU 11 acquires by executing a common-function setting file reference procedure 61 which is included in a start-up processing procedure 51 for common functions of the system software. The common-function setting file reference part 74 refers to the setting file 55 with respect to the common function of the system software in accordance with the procedure shown in the common-function setting file reference procedure 61. After referring to the setting file 55 on the common functions, the common-function setting file reference part 74 transfers the processing to the common-function device driver installing part 75.

The common-function device driver installing part 75 is a functional block exhibiting a function which the CPU 11 acquires by executing a common-function device driver installing procedure 62 which is included in the start-up processing procedure 51 of the common function of the system software. The common-function device driver installing part 75 installs the device driver 53 for the common function of the system software in accordance with procedure shown in a common-function device driver installing procedure 62. When the device driver 53 for the common function is installed, the common-function device driver installing part 75 transfers the processing to the common-function application start-up processing part 76.

The common-function application start-up processing part 76 is a functional block exhibiting a function which the CPU 11 acquires by executing a common-function application start-up procedure 63 which is included in the start-up processing procedure 51 of the common function of the system software. The common-function application start-up processing part 76 starts up the application 54 of the common function of the system software in accordance with the procedure shown in the common-function application start-up procedure 63.

The CPU 11 realizes the above-mentioned functional blocks by executing respective software. Here, it is needless to say that a part of or the whole of the respective functional blocks shown in FIG. 5 may be realized by hardware.

Figure 6:
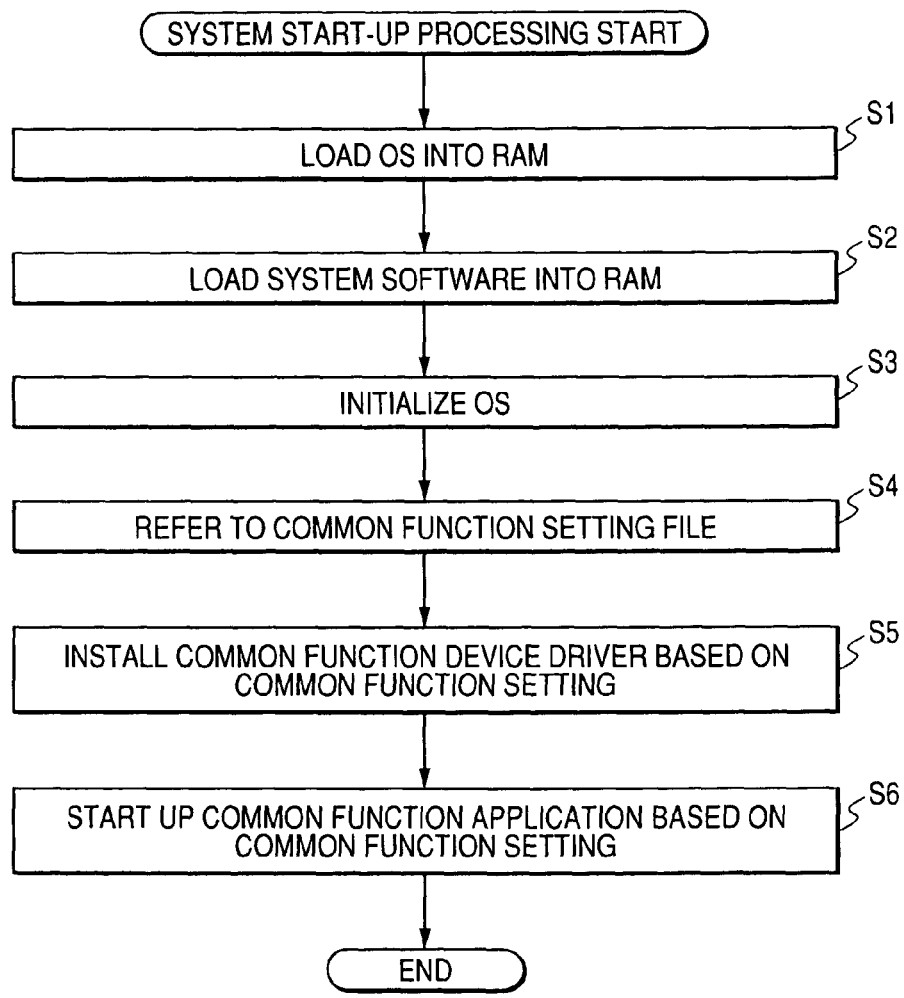
FIG. 6 is a flow chart showing an example of a flow of system start-up processing.

Next, an example of a flow of system start-up processing performed by the CPU 11 having such a constitution is explained in conjunction with a flow chart shown in FIG. 6.

When the system start-up processing is started, the OS loading processing part 71 reads out an operating system (OS) from the flash memory 15 and loads the operating system into the RAM 13 in step S1. The system software loading processing part 72 reads out system software from the flash memory 15 and loads the system software into the RAM 13 in step S2. The OS initializing processing part 73 initializes the operating system (OS) which is loaded into the RAM 13 in step S3. The common-function setting file reference part 74 refers to the setting file 55 on common functions of the system software loaded into the RAM 13 in step S4. The common-function device driver installing part 75 installs the device driver 53 for the common functions based on common-function setting which is included in the setting file 55 on the common functions in step S5. The common-function application start-up processing part 76 starts up the application 54 for the common functions based on common-function setting which is included in the setting file 55 on the common functions in step S6. When the start-up of the application 54 for the common functions finishes, the system start-up processing is finished.

As described above, since the system is started up in accordance with the preset procedures (the common-function setting file reference procedure 61, the common-function device driver installing procedure 62, and the common-function application start-up procedure 63), the CPU 11 can, without requiring instruction from a user, load the operating system and the system software stored in the flash memory 15 into the RAM 13 thus accurately starting up the system.

Further, in general, since the general-purpose platform 1 is assumed to be incorporated in various products, in order to lower the manufacturing cost of a product in which the general-purpose platform 1 is incorporated, for example, it is preferable that the constitution of the general-purpose platform 1 satisfies the necessity minimum. Since the CPU 11 performs the start-up processing based on the preset procedures as described above, the general-purpose platform 1 does not require the constitution which receives the manipulation of the user such as a keyboard, a display or the like whereby the increase of the constitution which is necessary for addition or updating of the software can be suppressed.

Here, in the common functions contained in the system software, a network function which enables the downloading of software from the outside and a software-updating function which installs the downloaded software to the general-purpose platform 1 are included.

Figure 7:
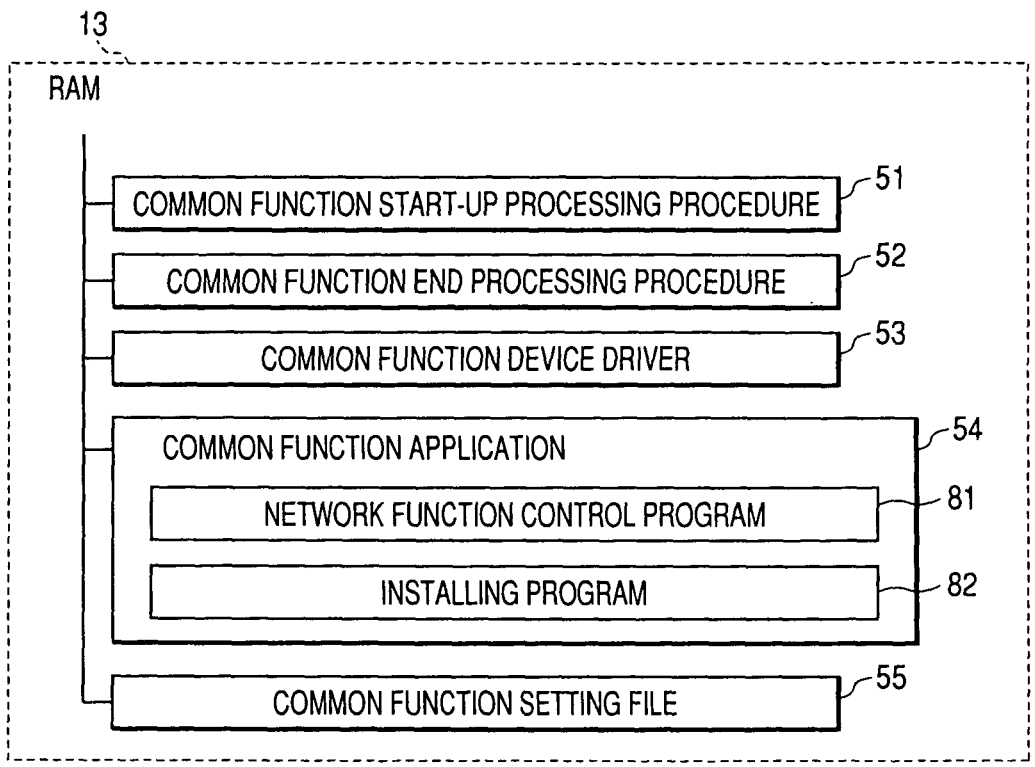
FIG. 7 is a view showing a constitutional example of software loaded in a RAM.

That is, as shown in FIG. 7, for example, the application 54 of the common functions loaded into the RAM 13 includes a network-function controlling program 81 and an installing program 82.

The network-function controlling program 81 is a program to control the Ethernet (Registered Trademark) I/F 14. The CPU 11 performs processing on the acquisition of a product package via the Ethernet (Registered Trademark) I/F 14, for example, by executing the network-function control program 81. The installing program 82 is a program to install the software. The CPU 11 performs, by executing the installing program 82, processing on the installing of the product package such as the installing of the product package acquired via the Ethernet (Registered Trademark) I/F 14 in the product package storing region 44 of the flash memory 15, for example.

Figure 8:
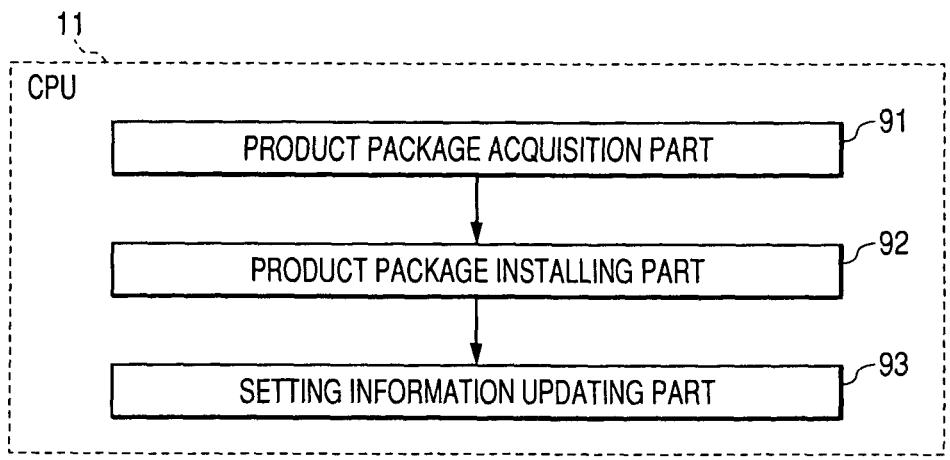
FIG. 8 is a functional block diagram showing the functions which a CPU has.

A constitutional example of the functional blocks of the CPU 11 which is acquired by performing such programs is shown in FIG. 8.

In FIG. 8, the CPU 11 includes a product package acquiring part 91, a product package installing part 92 and a setting information updating part 93.

The product package acquiring part 91 is a functional block exhibiting a function which is acquired by the CPU 11 by performing the network-function controlling program 81. The product package acquiring part 91 performs control processing on the acquisition of the product package. For example, the product package acquiring part 91 controls the Ethernet (Registered Trademark) I/F 14 so as to acquire the product package provided from the personal computer 21 via the network 22 and allows the RAM 13 to hold the product package. As the RAM 13 holds the product package, the product package acquiring part 91 transfers the processing to the product package installing part 92.

The product package installing part 92 is a functional block exhibiting a function which is acquired by the CPU 11 by executing the installing program 82. The product package installing part 92 performs control processing on the installing of the product package. For example, the product package installing part 92 installs the product package which is acquired by the product package acquiring part 91 and is stored in the RAM 13 into the product package storing region 44 of the flash memory 15. After the installation of the product package, the product package installing part 92 transfers the processing to the setting information updating part.

The setting information updating part 93 is a functional block showing a function which is acquired by the CPU 11 by executing the installing program 82. The setting information updating part 93 performs updating processing of the product package setting information 43 which follows the installation of the product package. For example, the setting information updating part 93 reflects (by adding or overwriting) the information of the installed product package on a list which is stored in the product package setting information 43 so as to make the installed product package effective (to start up the installed product package) from a next system start-up time.

Figure 9:
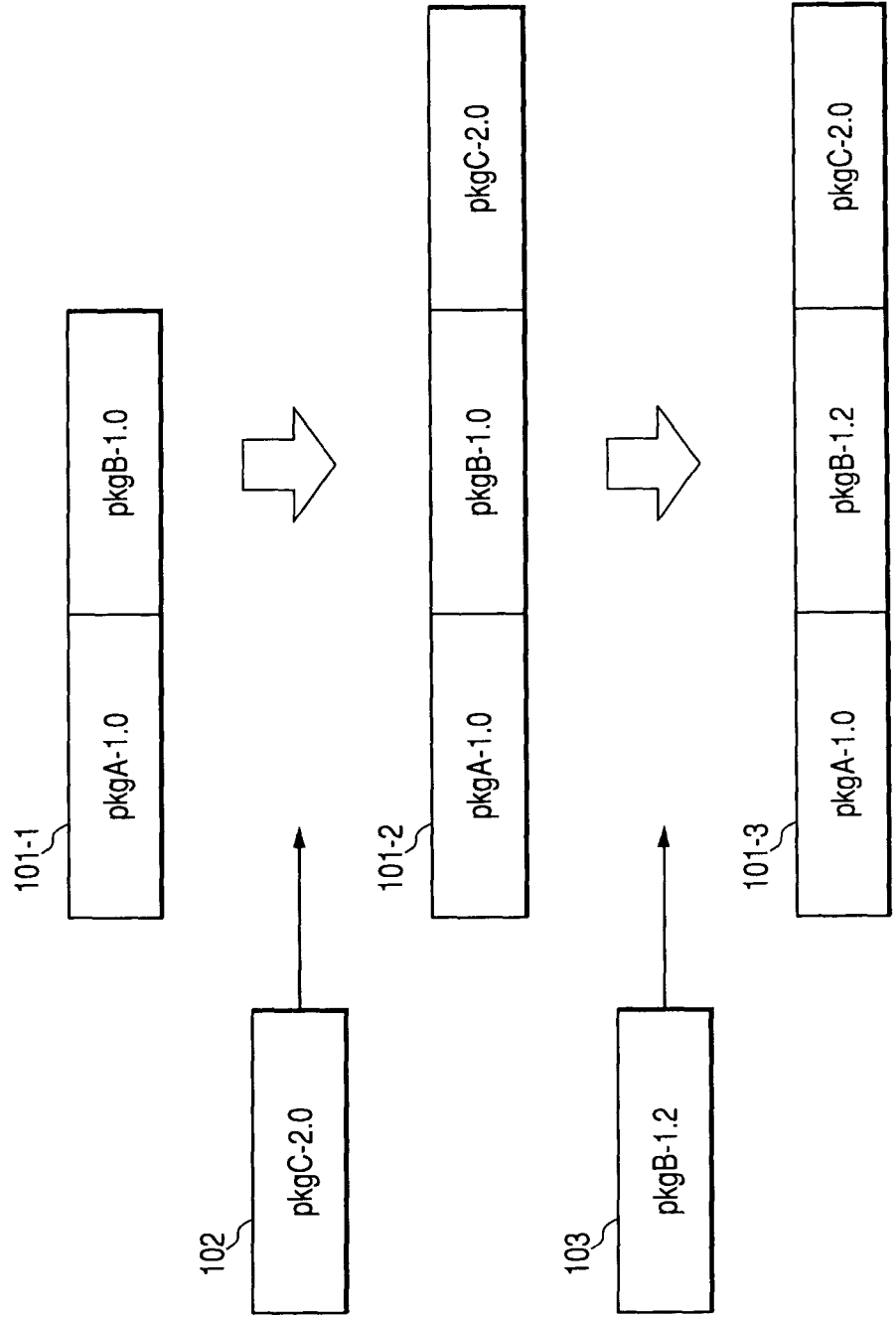
FIG. 9 is a view for explaining the manner of updating a list.

FIG. 9 is a view which explains the updating processing of the list stored in the product package setting information 43 executed by the setting information updating part 93.

For example, assumes that the product package setting information 43 stores the list 101-1 which is shown in FIG. 9. Each element of the list 101-1 is constituted of the information on "<package name>-<version number>" based on an archive file name of the product package. For example, the list 101-1 is constituted of two elements, that is, "pkgA-1.0" and "pkgB-1.0".

That is, the list 101-1 indicates that the product package whose name is "pkgA" and whose version number is "1.0" and the product package whose name is "pkgB" and whose version number is "1.0" are effective (the product packages are started up).

In this state, assuming that the product package whose name is "pkgC" and whose version number is "2.0" is installed, the setting information updating part 93 adds the information 102 indicative of the product package to the list 101-1. The content of the information 102 is "pkgC-2.0". The information 102 is added to the list 101-1 to form the list 101-2. Here, since an element whose package name is "pkgC" is not present in the list 101-1, the information 102 is, as a new element, added after the last element of the list 101-2. That is, in the list 101-2, the number of the elements is 3.

Further, in this state, when a product package whose name is "pkgB" and whose version number is "1.2" is installed, the setting information updating part 93 adds the information 103 indicative of the product package to the list 101-2. The content of the information 103 is "pkgB-1.2". The information 103 is added to the list 101-2 to form the list 101-3. Here, since an element whose package name is "pkgB" is present as the second element of the list 101-2 and the version number "1.0" thereof is different from the version number "1.2" which is included in the information 103, the information 103 is overwritten to the second element. That is, in the list 101-3, a value of the second element is updated to "pkgB-1.2" and the number of the elements remains at three.

That is, the setting information updating part 93 updates the list stored in the product package setting information 43 based on the package name or the version number of the installed product package, makes the setting of the installed product package effective, and prevents the same product packages which are different only inversion from each other (a plurality of product packages whose package names are overlapped) from becoming effective simultaneously.

Here, the setting information updating part 93 may compare the version numbers of the new and old product packages whose package names are overlapped to each other, and may assign priority to the product package of the newest version in making the product package effective or may assign priority to the product package of the oldest version in making the product package effective.

The CPU 11 realizes the above-mentioned functional blocks by executing the respective software. Here, it is needless to say that a portion or the whole of the respective functional blocks shown in FIG. 8 may be realized by hardware.

Figure 10:
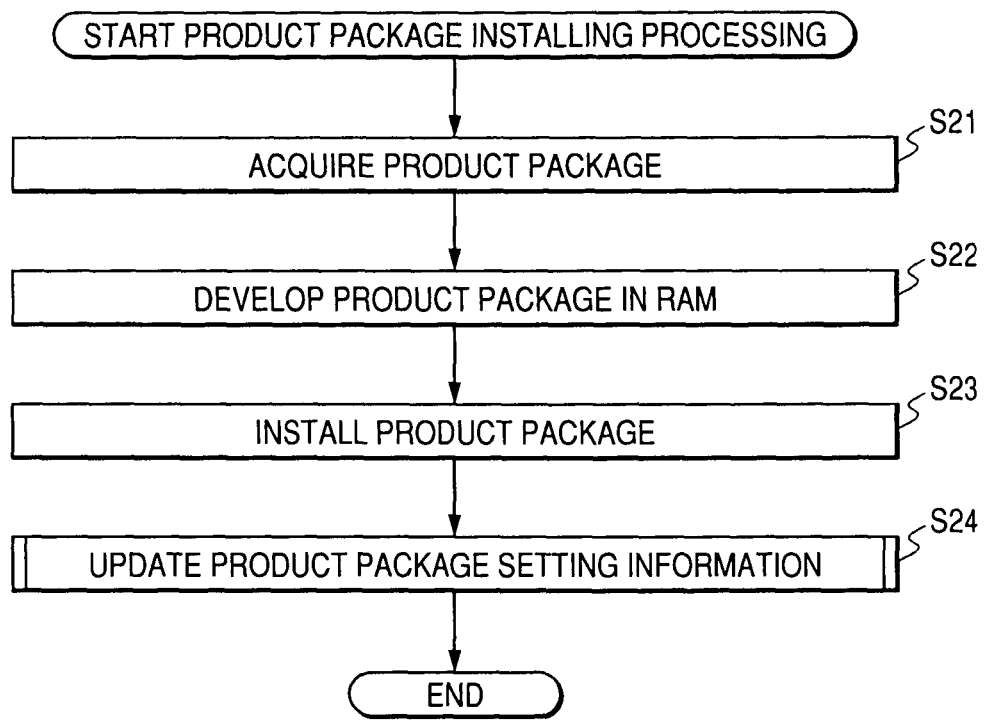
FIG. 10 is a flow chart for explaining an example of a flow of product package installing processing.

Next, an example of a flow of the product package installing processing executed by the CPU 11 shown in FIG. 8 is explained in conjunction with a flow chart shown in FIG. 10.

The product package acquiring part 91, in step S21, controls the Ethernet (registered trademark) I/F 14 and acquires the product package supplied from the personal computer 21 and allows the product package to be developed and held in the RAM 13 instep S22. Instep S23, the product package installing part 92 installs the product package held in the RAM 13 into the product package storing region 44 of the flash memory 15. When the product package is installed, the setting information updating part 93 updates the information stored in the product package setting information 43 in step S24 and finishes the product package installing processing.

Figure 11:
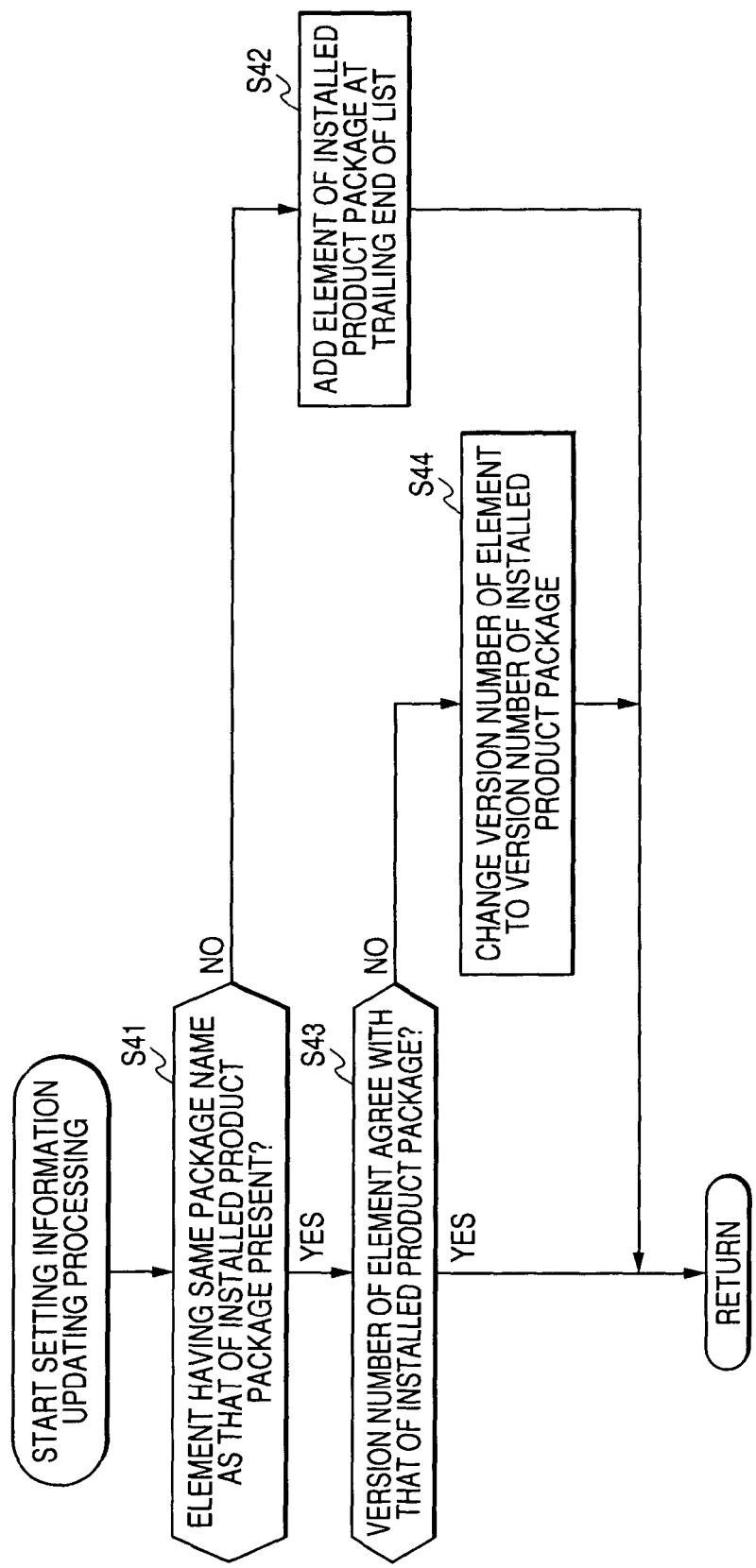
FIG. 11 is a flow chart for explaining an example of a flow of setting information updating processing.

Next, in conjunction with a flow chart shown in FIG. 11, an example of a detailed flow of the setting information updating processing executed in step S24 shown in FIG. 10 is explained.

In step S41, the setting information updating part 93 which starts the setting information updating processing determines whether an element having the same package name as the product package installed by the product package installing part 92 is present in a list or not. When the setting information updating part 93 determines that the element having the same package name as the product package installed by the product package installing part 92 is not present, the setting information updating part 93 advances the processing to step S42 and adds an element indicative of the product package installed by the product package installing part 92 (element which is constituted of a product package name and version information of the product package installed by the product package installing part 92) to a trailing end of the list. When the processing of step S42 is finished, the setting information updating part 93 finishes the setting information updating processing, returns the processing to step S24 shown in FIG. 10 and finishes the product package installing processing.

Further, in step S41 shown in FIG. 11, when the setting information updating part 93 determines that the element having the same package name as the product package installed by the product package installing part 92 is present in the list, the setting information updating part 93 advances the processing to step S43. In step S43, the setting information updating part 93 determines whether the version number of the element having the same package name as the product package installed by the product package installing part 92 agrees with the version number of the product package installed by the product package installing part 92 or not.

When the setting information updating part 93 determines that the element having the same package name and the same version number as the product package installed by the product package installing part 92 is present, the setting information updating part 93 finishes the setting information updating processing, returns the processing to step S24 shown in FIG. 10 and finishes the product package installing processing.

Further, when the setting information updating part 93 determines that although the element having the package name which agrees with the name of the product package installed by the product package installing part 92 is present, the element having the version number which agrees with the version number of the product package installed by the product package installing part 92 is not present, the setting information updating part 93 advances the processing to step S44 and changes the version number of the element whose product package name coincides with the name of the installed product package to the version number of the installed product package. When the processing in step S44 is finished, the setting information updating part 93 finishes the setting information updating processing, returns the processing to step S24 shown in FIG. 10 and finishes the product package installing processing.

In this manner, the CPU 11 not only acquires the product package from the external device and installs the product package into the product package storing region 44 in the flash memory 15, but also updates a list of the product package setting information along with the installation of the product package and hence, it is possible to set the installed product package to be effective from the next system start-up time without requiring an instruction from a user. That is, the general-purpose platform 1 can properly install the product package supplied from the outside even when the user interface such as a monitor or a keyboard is not provided. That is, it is unnecessary for the user to perform cumbersome operations to install the product package such as the connection of a notebook-type personal computer with the general-purpose platform 1 and subsequent control of the product package installing processing by the general-purpose platform 1 using the notebook-type personal computer whereby the user can easily and properly install the product package.

Further, due to such a constitution, the general-purpose platform 1 no more requires the constitution which is necessary only for the installation of the product package and hence, it is possible to suppress the increase of the constitution brought about by the installation of the product package thus suppressing not only the increase of the cost for manufacturing, development and the like of the general-purpose platform 1 but also the increase of the cost for manufacturing, development and the like of a product into which the general-purpose platform 1 is incorporated.

Figure 12:
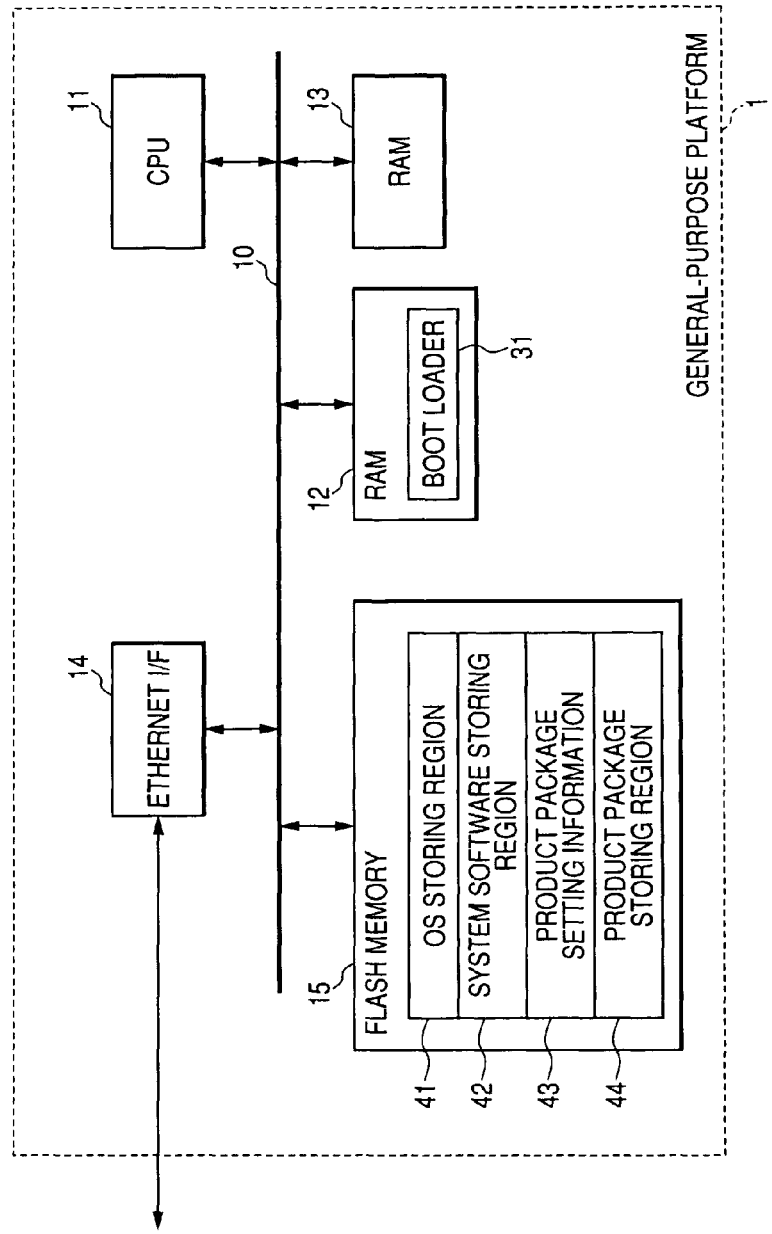
FIG. 12 is a view showing a constitutional example of a memory region of a general-purpose platform.

When the product package installing processing is performed in this manner, the product package setting information 43 and the product package storing region 44 which are available spaces in FIG. 3 are no more available spaces as shown in FIG. 12. That is, in a state shown in FIG. 12, the product packages not shown in the drawing are stored in the product package storing region 44 and a list of effective product packages out of the product packages stored in the product package storing region 44 is stored in the product package setting information 43.

Next, the explanation is made with respect to a case in which the system of the general-purpose platform 1 is started up in a state that the product package is installed in the above-mentioned manner, that is, in a state shown in FIG. 12. In this case, both of the system software and the product package are loaded into the RAM 13 and are reconstructed in the execution environmental area. That is, due to such reconstruction, the common function and the function intrinsic to the product are effectively set.

In the state shown in FIG. 12, when the system of the general-purpose platform 1 is started, in the same manner as the case in which the system is started from the state shown in FIG. 3, first of all, the execution control is transferred to the boot loader 31 stored in the ROM 12. That is, the CPU 11 reads out the boot loader 31 of the ROM 12, loads the boot loader 31 into the RAM 13 and executes the boot loader 31. The boot loader 31 executed by the CPU 11 reads out the operating system and the system software from the flash memory 15 and loads (copies) the operating system and the system software into the RAM 13. Then, the boot loader 31 transfers the processing to the operating system. The operating system starts the initialization, mounts the system software and refers to a common-function setting file. The operations described heretofore are substantially equal to the operations in the system start-up in a state before the product package is installed.

FIG. 13 shows the file constitution which is included in the system software loaded in the RAM 13 and the file constitution which is included in the product package loaded in the RAM 13. The system software includes, in the same manner as the example shown in FIG. 4, files ranging from the common-function start-up processing procedure 51 to the setting file 55 on common functions.

However, in this case, the start-up processing procedure 51 for the common functions includes, besides the constitution of the example shown in FIG. 4, product package mounting procedure 111 and common-function setting file merging procedure 112.

The product package mounting procedure 111 is the information indicative of procedure for mounting the product package to be stored in the product package storing region 44 of the flash memory 15. The common-function setting file merging procedure 112 is the information which becomes necessary due to mounting of the product package and is the information indicative of procedure for merging (integrating) the information on the setting file 55 on the common functions and a setting file 125 (described later) on the common functions which the product package includes.

Further, when the product package is mounted in accordance with the product package mounting procedure 111, a directory of "product package name" is constructed in a directory structure constructed in the inside of the RAM 13 shown in FIG. 13 and, respective files of the product package are mounted below the directory.

As shown in FIG. 13, the files of the product package include start-up processing procedure 121 intrinsic to the product, an end processing procedure 122 intrinsic to the product, a device driver 123 intrinsic to the product, an application 124 intrinsic to the product and the setting file 125 on the common functions.

The start-up processing procedure 121 intrinsic to the product is procedure for the start-up processing of the functions intrinsic to the product and the end processing procedure 122 intrinsic to the product is procedure for end processing of the function intrinsic to the product. The device driver 123 intrinsic to the product and the application 124 intrinsic to the product are a device driver and an application intrinsic to the product for supplying functions intrinsic to the product, respectively. Further, the setting file 125 on the common functions is the information indicative of an updating portion of the setting file 55 on the common functions which is necessary when the product package is installed. That is, the setting file 125 on the common functions reflects the presence of the product package on the setting information of the setting file 55 on the common functions.

Further, the start-up processing procedure 121 intrinsic to the product 121 includes a first product intrinsic start-up processing procedure 131 and a second product intrinsic start-up processing procedure 132.

The first product intrinsic start-up processing procedure 131 is the information indicative of procedure for the start-up processing which is necessary before starting the application for the common functions. For example, when a log of a logging function which is a common function is preserved in a device intrinsic to the product, before the logging function is started, the installing processing of the device driver intrinsic to the product and the mounting processing intrinsic to the product become necessary. The first product intrinsic start-up processing procedure 131 indicates procedure for such processing.

The second product intrinsic start-up processing procedure 132 is the information indicative of start-up procedure for the processing which is necessary after starting the application 54 for the common functions. For example, it is necessary to perform the start-up of the application which takes a log using the logging function which is the common function after the logging function is started up. The second product intrinsic start-up processing procedure 132 is procedure indicative of such processing.

In this manner, the start-up processing procedure 121 intrinsic to the product includes procedure for the start-up processing intrinsic to the product which is divided into a plurality of files such as, for example, the first product intrinsic start-up processing procedure 131 and the second product intrinsic start-up processing procedure 132 in response to the common-function application start-up procedure 63 indicative of start-up procedure of the common-function application 54. Due to such a constitution, the start-up processing procedure 121 intrinsic to the product can indicate more proper start-up processing procedure. That is, the CPU 11 can perform the start-up processing of the application more properly.

FIG. 14 shows a constitutional example of a functional block exhibiting functions which the CPU 11 possesses. In FIG. 14, the CPU 11 includes, as functional blocks ranging from the OS loading processing part 71 to the common-function application start-up processing part 76 in the same manner as the case shown in FIG. 5. The CPU 11 further includes a product package loading processing part 141, a common-function setting merging processing part 142, a first product intrinsic start-up processing procedure execution part 143 and a second product intrinsic start-up processing procedure execution part 144.

When the processing is finished, the OS initializing processing part 73 transfers the processing to the product package loading processing part 141.

The product package loading processing part 141 is the functional block indicative of a function which the CPU 11 acquires by executing a product package mount procedure 111. The product package loading processing part 141 reads out a product storing package which is stored in a product package storing region 44 of the flash memory 15, and loads the product package to the RAM 13, and then mounts the product package at predetermined location in a directory structure of a file system which an operating system manages. When the loading of the product package is finished, the product package loading processing part 141 transfers the processing to the common-function setting merging processing part 142.

The common-function setting merging processing part 142 is the functional block indicative of a function which the CPU 11 acquires by executing a common-function setting file merge procedure 112. The common-function setting merging processing part 142 integrates (for example, by overwriting and copying, file connection, (merging) of description for each row or the like) a setting file 125 on common functions which are included in an effective product package (a mounted product package) with a setting file 55 on common functions which are originally present in the system software. The setting file 125 on common functions includes, for example, a setting file (syslog.conf) on a system logging function which is the common function and a setting file (passwd) on a user account management function. With this processing, it is possible to customize setting on common functions which the system software possesses to product intrinsic setting. When merging of the setting file on the common functions is finished, the common-function setting merging processing part 142 transfers the processing to a common-function setting file reference part 74. The common-function setting file reference part 74 refers to the common-function setting file, and transfers the processing to a common-function device driver installing part 75.

When the processing is finished, the common-function device driver installing part 75 transfers the processing to a first product intrinsic start-up processing procedure execution part 143.

The first product intrinsic start-up processing procedure execution part 143 is a functional block indicative of a function which the CPU 11 acquires by executing a first product intrinsic start-up processing procedure 131. The first product intrinsic start-up processing procedure execution part 143 executes start-up processing on a product intrinsic function which is necessary before starting up an application of the common functions. When the start-up processing on the product intrinsic function is finished, the first product intrinsic start-up processing procedure execution part 143 transfers the processing to a common-function application start-up processing part 76.

When the processing is finished, the common-function application start-up processing part 76 transfers the processing to a second product intrinsic start-up processing procedure execution part 144.

The second product intrinsic start-up processing procedure execution part 144 is a functional block indicative of a function which the CPU 11 acquires by executing a second product intrinsic start-up processing procedure 132. The second product intrinsic start-up processing procedure execution part 144 executes start-up processing on a product intrinsic function which is necessary to start up after starting up the common-function application 54.

The CPU 11 realizes the above-mentioned functional blocks by executing respective software. Here, it is needless to say that a part of or the whole of the respective functional blocks shown in FIG. 14 may be realized by hardware.

Figure 16:
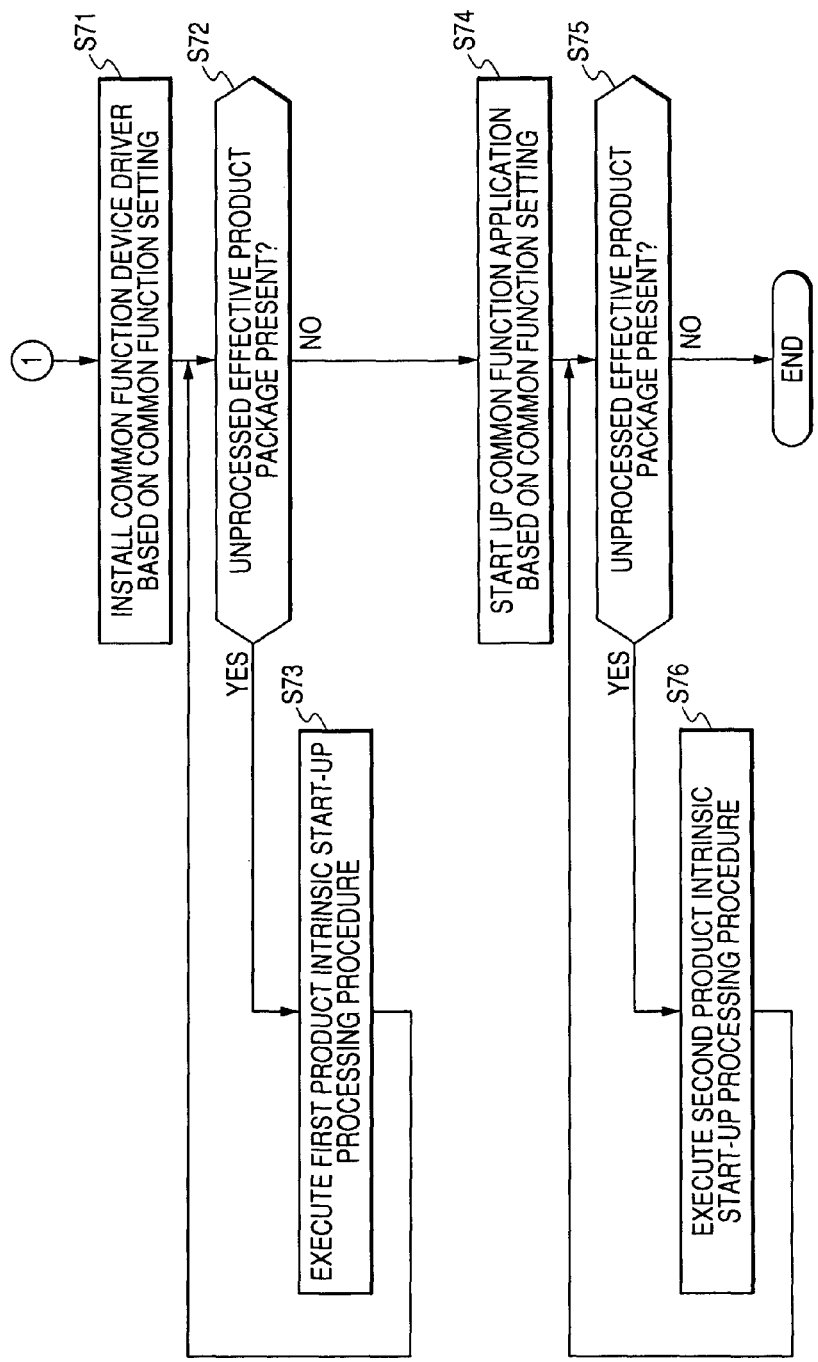
FIG. 16 is a flow chart which follows FIG. 15 for explaining the example of the flow of the system start-up processing.

Next, an example of a flow of system start-up processing which is executed by the CPU 11 having such constitution is explained in conjunction with a flow chart shown in FIG. 15 and FIG. 16.

When the system start-up processing is started, the OS loading processing part 71 to the OS initializing processing part 73 respectively execute the processing in step S61 to step S63 shown in FIG. 15 in the same manner as the processing performed in step S1 to step S3 shown in FIG. 6.

When the processing in step S63 is finished, the common-function setting file reference part 74 advances the processing to step S64. In step S64, the product package loading processing part 141 determines whether unprocessed effective product packages are present or not. That is, the product package loading processing part 141 determines whether the product packages which are set to be "effective" (the product packages whose information is registered in a list stored in the product package setting information) and are not yet loaded in the RAM 13 are present or not.

When it is determined that the unprocessed effective product packages are present, the product package loading processing part 141 advances the processing to step S65, and loads the product package into the RAM 13, and then mounts the product package at predetermined position in the directory structure. When the processing in step S65 is finished, the product package loading processing part 141 returns the processing to step S64, and repeats subsequent processing. That is, the product package loading processing part 141 repeats the processing in step S64 and step S65 until it is determined that the unprocessed effective product packages are not present (until all effective product packages are loaded into the RAM 13).

In step S64, when it is determined that the unprocessed effective product packages are not present, the product package loading processing part 141 advances the processing to step S66.

In step S66, the common-function setting merging processing part 142 determines whether the unprocessed effective product packages are present or not. That is, the common-function setting merging processing part 142 determines whether the product packages which are set to be "effective" (the product packages which are loaded into the RAM 13 in step S65) and do not yet merge the setting file 125 on common functions and the setting file 55 on the common function of the system file are present or not.

When it is determined that the unprocessed effective product packages are present, the common-function setting merging processing part 142 advances the processing to step S67, and the setting file 125 on the common functions of the product packages is merged with the setting file 55 on the common functions of the system file. When processing of step S67 is finished, the common-function setting merging processing part 142 returns the processing to step S66, and repeats the subsequent processing. That is, the common-function setting merging processing part 142 repeats the processing of step S66 and step S67 until it is determined that the unprocessed effective product packages are not present (until the setting file 125 on the common functions of all effective product packages is merged with the setting file 55 on the common functions of the system file).

In step S66, when it is determined that the unprocessed effective product packages are not present, the common-function setting merging processing part 142 advances the processing to step S68. In step S68, the common-function setting file reference part 74 refers to a common-function setting file which is merged due to the processing in step S67. After referring to the common-function setting file, the common-function setting file reference part 74 advances the processing to step S71 shown in FIG. 16.

In step 71 shown in FIG. 16, the common-function device driver installing processing part 75 performs the processing in the same manner as the processing in step 5 shown in FIG. 6, and installs the device drivers 53 for the common functions based on the common-function setting. When the processing in step S65 is finished, the common-function device driver installing processing part 75 advances the processing to step S72.

In step S72, the first product intrinsic start-up processing procedure execution part 143 determines whether the unprocessed effective product packages are present or not. That is, the first product intrinsic start-up processing procedure execution part 143 determines whether the product packages which are set to be "effective" (the product packages which are loaded into the RAM 13 in step S66 shown in FIG. 15) and have not yet installed a product intrinsic device driver 123 which is to be installed in the product packages prior to the application 54 for the common functions are present or not, or whether the product packages which have not yet started up the product intrinsic applications 124 which is to be started up prior to the application 54 for the common function are present or not.

When it is determined that the unprocessed effective product packages are present, the first product intrinsic start-up processing procedure execution part 143 advances the processing to step S73, and executes first product intrinsic start-up processing procedure 131, and then installs the product intrinsic device drivers 123 of the product packages and starts up the product intrinsic applications 124. When the processing in step S73 is finished, the first product intrinsic start-up processing procedure execution part 143 returns the processing to step S72, and repeats the subsequent processing. That is, the first product intrinsic start-up processing procedure execution part 143 repeats the processing in step S72 and step S73 until it is determined that the unprocessed effective product packages are not present (until the product intrinsic device driver 123 of all effective product packages which is to be installed prior to the application 54 of the common functions is installed, and the product intrinsic applications 124 which are to be started up prior to the application 54 of the common functions).

In step 73, when it is determined that the unprocessed effective product packages are not present, the first product intrinsic start-up processing procedure execution part 143 advances the processing to step S74.

In step 74, the common-function application start-up processing part 76 executes the processing in the same manner as the processing in step S6 shown in FIG. 6, and starts up the application 54 for the common functions based on the common-function setting. When the processing in step S74 is finished, the common-function application start-up processing part 76 advances the processing to step S75.

In step 75, the second product intrinsic start-up processing procedure execution part 144 determines whether the unprocessed effective product packages are present or not. That is, the second product intrinsic start-up processing procedure execution part 144 determines whether the product packages which are set to be "effective" (the product packages which are loaded into the RAM 13 in step S66 shown in FIG. 15) and do not yet install a product intrinsic device driver 123 which is to be installed in the product packages prior to the application 54 for the common functions are present or not, or whether the product packages which the product intrinsic applications 124 which do not start up the application 124 intrinsic to the product which is to be started up prior to the application 54 for the common functions are present or not.

When it is determined that the unprocessed effective product packages are present, the second product intrinsic start-up processing procedure execution part 144 advances the processing to step S76, and executes second product intrinsic start-up processing procedure 132, and then installs the product intrinsic device drivers 123 of the product packages and starts up the product intrinsic applications 124. When processing in step S76 is finished, the second product intrinsic start-up processing procedure execution part 144 returns the processing to step S75, and repeats the subsequent processing. That is, the second product intrinsic start-up processing procedure execution part 144 repeats the processing in step S75 and step S76 until it is determined that the unprocessed effective product packages are not present (until the product intrinsic device driver 123 of all effective product packages which is to be installed prior to the application 54 of the common functions is installed, and the product intrinsic applications 124 which are to be started up prior to the application 54 of the common functions).

In step S75, when it is determined that the unprocessed effective product packages are not present, the second product intrinsic start-up processing procedure execution part 144 finishes a system start-up processing.

As described above, since the system is started up in accordance with preset procedures (the common-function setting file reference procedure 61, the common-function device driver install procedure 62, and the common-function application start-up procedure 63), the CPU 11 can accurately start up the system without requiring an instruction from a user by loading not only an operating system or system software which is stored in the flash memory 15 but also the product-intrinsic product packages to the RAM 13.

That is, by starting up the system as described above, the CPU 11 can reconstruct not only the operating system or the system software but also the product packages which provide the product intrinsic function in the execution environment area of the RAM 13 which is different from the flash memory 15 which is storing region thereof thus making both of the common functions and the product intrinsic functions effective. Further, in this manner, by performing the start-up processing in a state that the constitution is reconstituted on the RAM 13, the CPU 11 can store, in the flash memory 15, the operating system, the system software and the product packages which provide the product intrinsic functions with the constitution different from the constitution in the execution environment. That is, the flash memory 15 can store the operating system, the system software and the product packages in regions different from each other.

In this manner, the flash memory 15 stores the respective software in regions different from each other. Accordingly, the CPU 11 can perform the processing such as addition, deletion and updating of product packages without updating the operating system or the system software. That is, the general-purpose platform 1 can perform addition, deletion and updating of functions more safely.

Next, updating of the setting of effectiveness or ineffectiveness of the respective product packages which are installed in the above-mentioned manner is explained.

Figure 17:
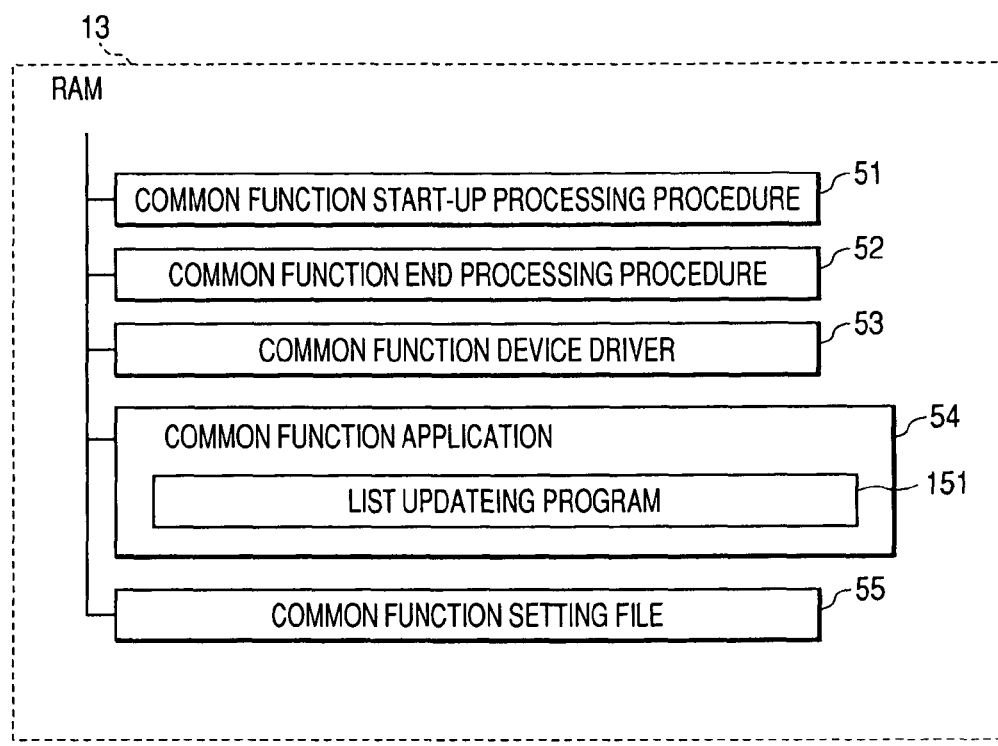
FIG. 17 is a view showing a constitutional example of software loaded in a RAM.

As shown in FIG. 17, the application 54 for the common functions which is loaded into the RAM 13 includes a list updating program 151 which updates the information in a list indicative of effective product packages which are stored in the product package setting information 43 based on an instruction from the outside such as a user, for example.

By executing this list updating program 151, as shown in FIG. 18, the CPU 11 includes a setting information change instruction acquisition part 161 and a setting information updating part 162 as functional blocks.

The setting information change instruction acquisition part 161 is a functional block indicative of a function obtained by executing the list updating program 151 with the CPU 11. The setting information change instruction acquisition part 161 acquires the setting change instruction as an instruction for changing over the setting of effectiveness and ineffectiveness of the product package from the personal computer 21 via the Ethernet (registered trademark) I/F 14, for example. Upon acquisition of the setting change instruction, the setting information change instruction acquisition part 161 transfers the processing to the setting information updating part 162.

The setting information updating part 162 is a functional block indicative of a function obtained by executing the list updating program 151 with the CPU 11. The setting information updating part 162 updates, for example, the information in the list stored in the product package setting information 43 based on the setting change instruction acquired by the setting information change instruction acquisition part 161.

By executing respective software, the CPU 11 realizes the above-mentioned functional blocks. Here, it is needless to say that a portion or the whole of respective functional blocks shown in FIG. 18 may be realized using hardware.

Figure 19:
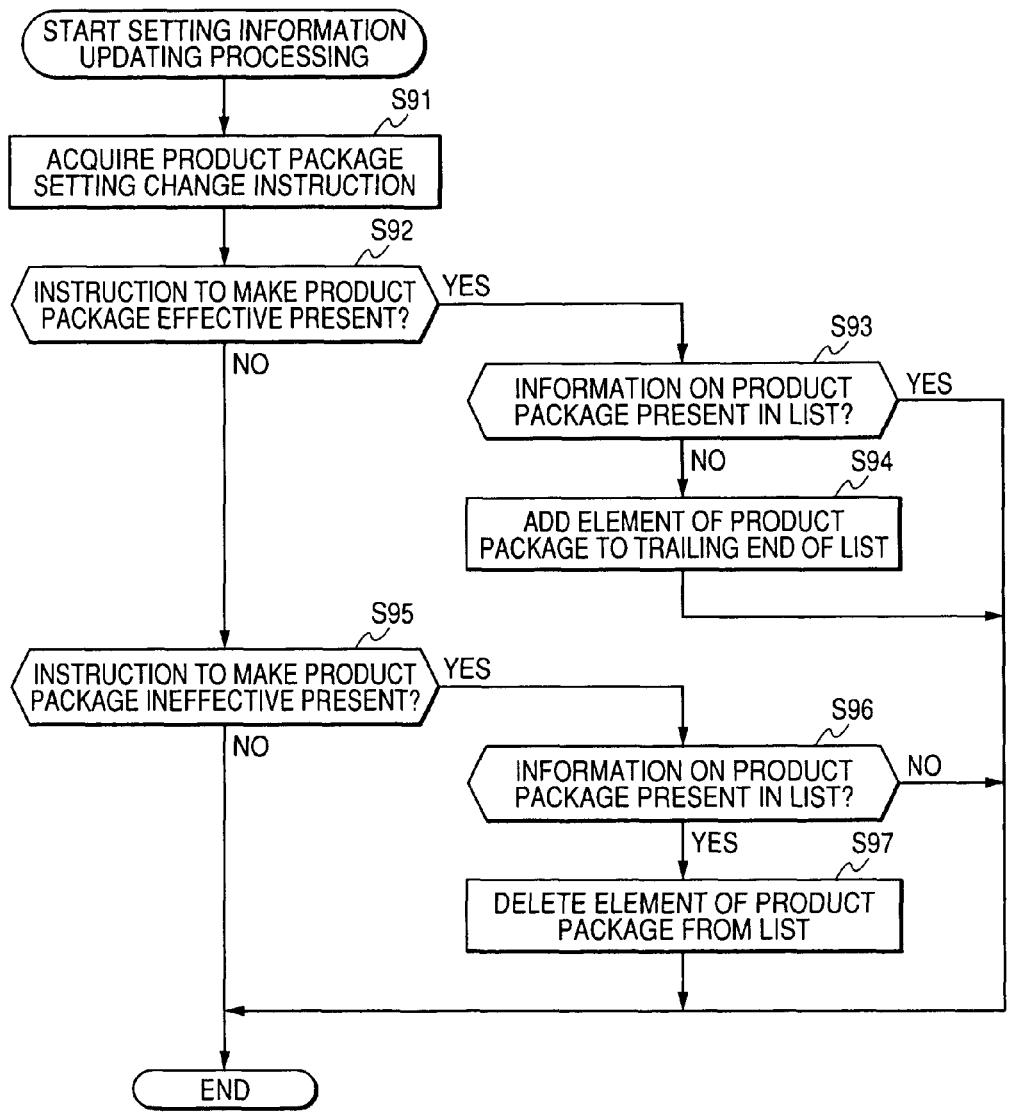
FIG. 19 is a flow chart for explaining an example of a flow of setting information updating processing.

Next, an example of a flow of the setting information updating processing which is executed by the CPU 11 having such constitution is explained in conjunction with a flow chart shown in FIG. 19.

First of all, in step S91, by controlling the Ethernet (registered trademark) I/F 14, for example, the setting information change instruction acquisition part 161 acquires a product package setting change instruction supplied from the personal computer 21. Upon acquisition of the setting change instruction, in step S92, the setting information updating part 162 determines whether the setting information instruction is an instruction to make the product package effective which changes over the setting of the product package to "effective" or not. When the setting information updating part 162 determines that the setting change instruction acquired by the setting information change instruction acquisition part 161 is the instruction to make the product package effective, the setting information updating part 162 advances the processing to step S93.

In step S93, the setting information updating part 162 determines whether the information of the product package designated by the setting change instruction is present in the list or not. When the setting information updating part 162 determines that the information of the product package is not present in the list, the setting information updating part 162 advances the processing to step S94 and, to make the setting of the product package "effective", newly adds the element of the product package to the trailing end of the list and finishes the setting information updating processing.

Further, in step S93, when the setting information updating part 162 determines that the information of the product package is present in the list, since the product package is already set to "effective", the setting information updating part 162 omits the processing of step S94 and finishes the setting information updating processing.

Further, in step S92, when the setting information updating part 162 determines that the setting change instruction acquired by the setting information change instruction acquisition part 161 is not the instruction to make the product package effective, the setting information updating part 162 advances the processing to step S95.

In step S95, the setting information updating part 162 determines whether the setting change instruction is an instruction to make the product package ineffective, that is, to change over the setting of the product package to "ineffective" or not. When the setting information updating part 162 determines that the setting change instruction acquired by the setting information change instruction acquisition part 161 is the instruction to make the product package ineffective, the setting information updating part 162 advances the processing to step S96.

In step S96, the setting information updating part 162 determines whether the information of the product package designated by the setting change instruction is present in the list or not. When the setting information updating part 162 determines that the information of the product package is present in the list, the setting information updating part 162 advances the processing to step S97 and, to make the setting of the product package "ineffective", deletes the element of the product package from the list and finishes the setting information updating processing.

Further, in step S96, when the setting information updating part 162 determines that the information of the product package is not present in the list, since the setting of the product package is already made "ineffective", the setting information updating part 162 omits the processing in step S97 and finishes the setting information updating processing.

Further, in step S95, when the setting information updating part 162 determines that the setting change instruction acquired by the setting information change instruction acquisition part 161 is not the instruction to make the product package ineffective, the setting information updating part 162 finishes the setting information updating processing.

In this manner, the CPU 11 can make the product package effective or ineffective by only adding the information of the product package to the list stored in the product package setting information 43 in the flash memory 15 or only by deleting the information from the list without adding or deleting the product package per se. Further, as described above, by controlling the Ethernet (registered trademark) I/F 14, for example, the CPU 11 can acquire a setting change instruction which changes over the setting of respective product packages which supply functions from the outside. That is, the general-purpose platform 1 can easily perform addition, deletion and updating of the functions.

Here, in the above-mentioned description, the start-up processing of the system after installing the product package which is explained in conjunction with the flow chart shown in FIG. 15 and FIG. 16 is merely an example and hence, the CPU 11 may start the system using a method other than the method described above.

For example, in the start-up processing of the system after installing the product package, the CPU 11 may execute a preset command prepared in the product package at predetermined timing.

Figure 20:
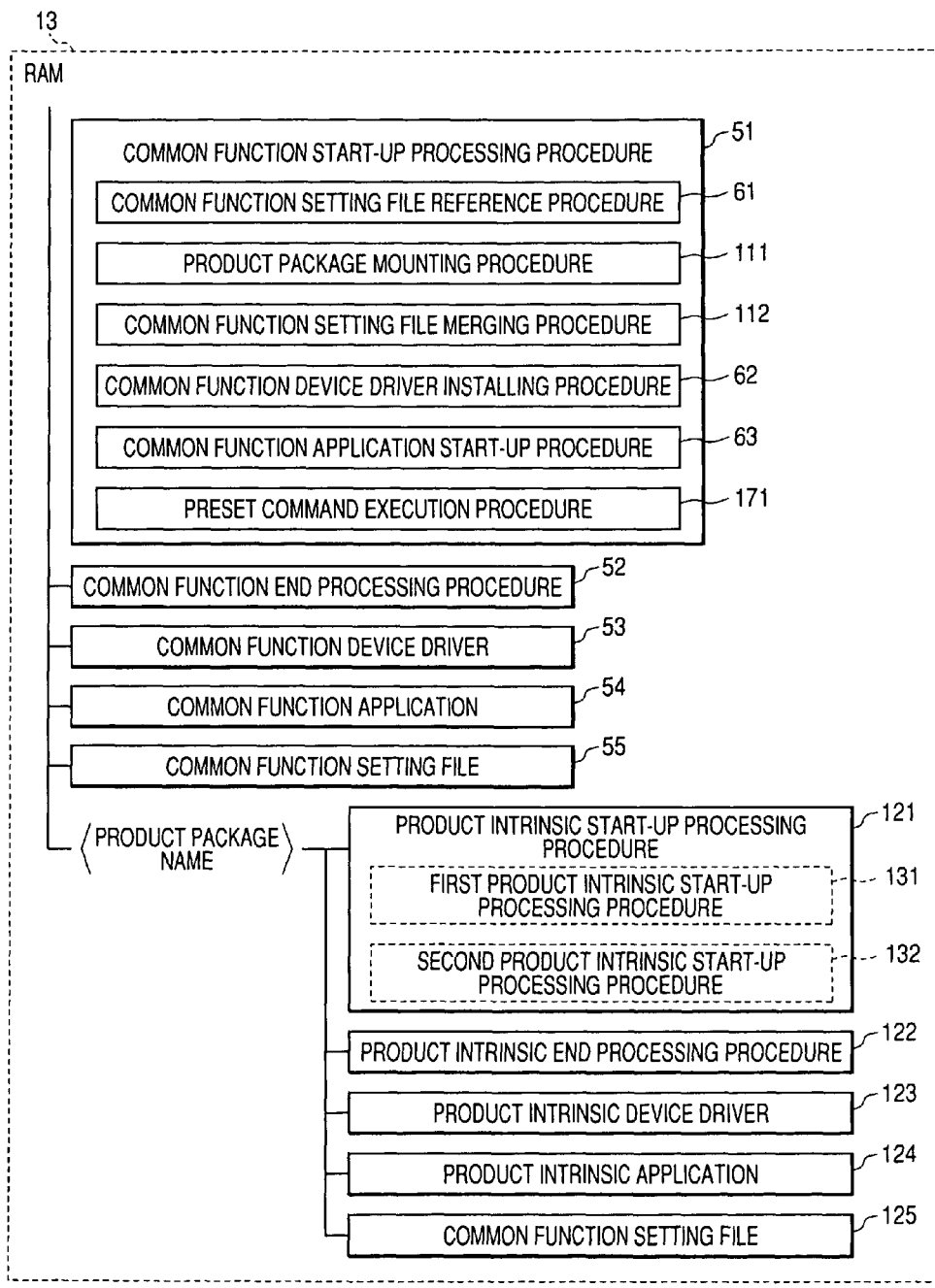
FIG. 20 is a view showing a constitutional example of software loaded in a RAM.

In this case, as shown in FIG. 20, the start-up processing procedure 51 for common functions which is mounted in the RAM 13 includes a preset command execution procedure 171 indicative of an execution procedure of the preset command besides the constitution shown in FIG. 13.

The preset command execution procedure 171 is the information indicative of execution procedure of a preset command in each phase. For example, among the product packages, the preset command execution procedure 171 presets a command name of a command prepared in the product package and parameters to be transferred at the time of executing the commands at respective phases.

By executing this preset command execution procedure 171, as shown in FIG. 21, the CPU 11 includes a preset command execution part 181 as a functional block. That is, in the CPU 11 shown in FIG. 21, the preset command execution part 181 is added to the constitution shown in FIG. 14.

The preset command execution part 181 is the functional block indicative of a function obtained by executing the preset command execution procedure 171 with the CPU 11. The preset command execution part 181 is, for example, controlled by the product package loading processing part 141, the common-function setting merging processing part 142, the first product intrinsic start-up processing procedure execution part 143 or the second product intrinsic start-up processing procedure execution part 144 and executes the commands defined in the preset command execution procedure 171 in respective phases in the system start-up processing.

For example, in the preset command execution procedure 171, the information such as "<product package name>/phase_command 01", "<product package name>/phase_command 02" and "<product package name>/phase_command 03" are preset. The preset command execution part 181 sequentially executes these commands in respective phases to which the respective commands are allocated.

Here, specific processing which the present command (phase_command) performs depends on each product package. For example, by displaying a LED device intrinsic to the product corresponding to a parameter, a state of progress of the start-up processing may be displayed, or a log of the start-up processing may be outputted to a host computer via a network. Further, another processing may be performed.

By executing respective software, the CPU 11 realizes the above-mentioned functional blocks. Here, a portion or whole of respective functional blocks shown in FIG. 21 may be realized using hardware.

Figure 22:
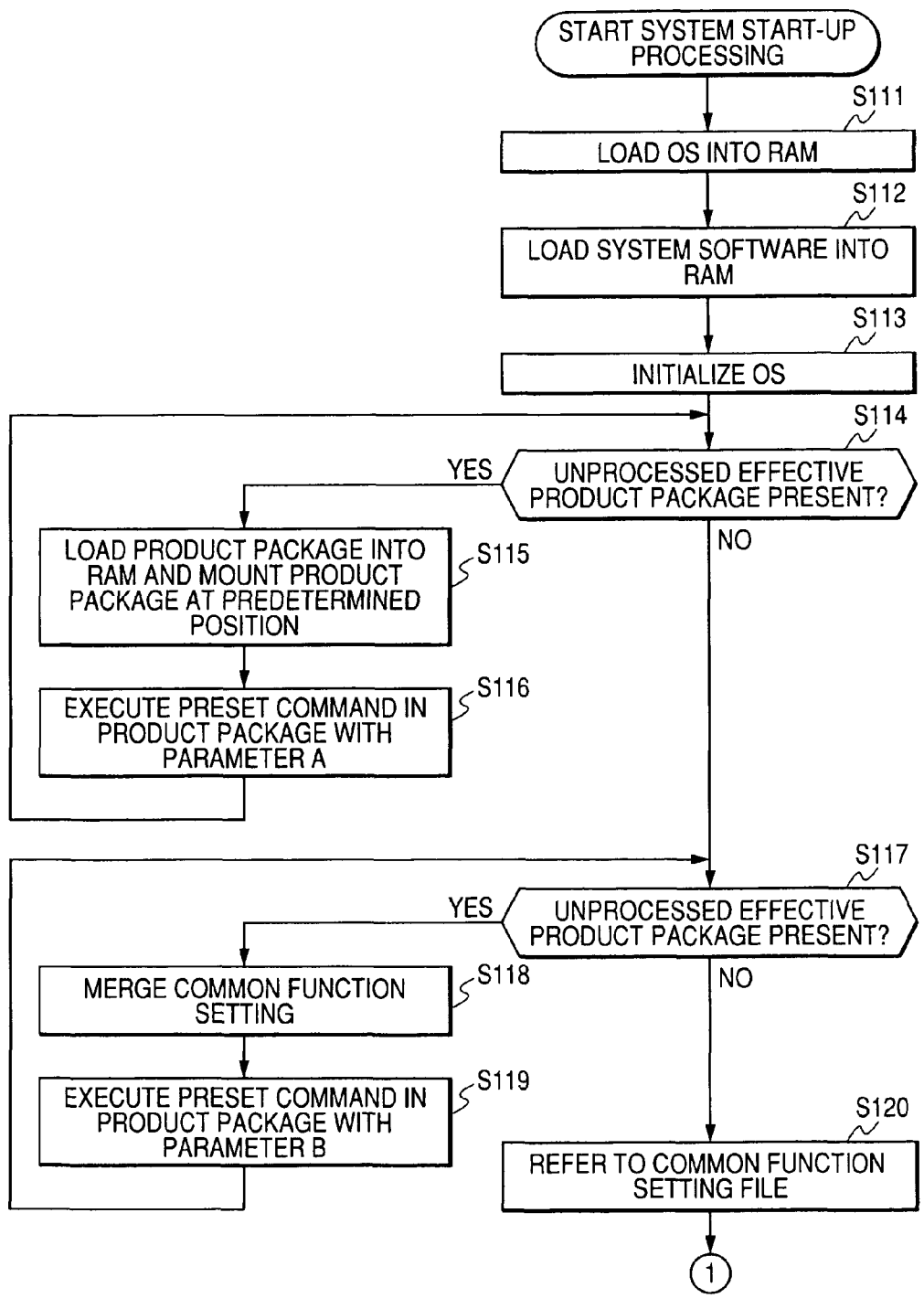
FIG. 22 is a flow chart for explaining an example of a flow of a system start-up processing.
Figure 23:
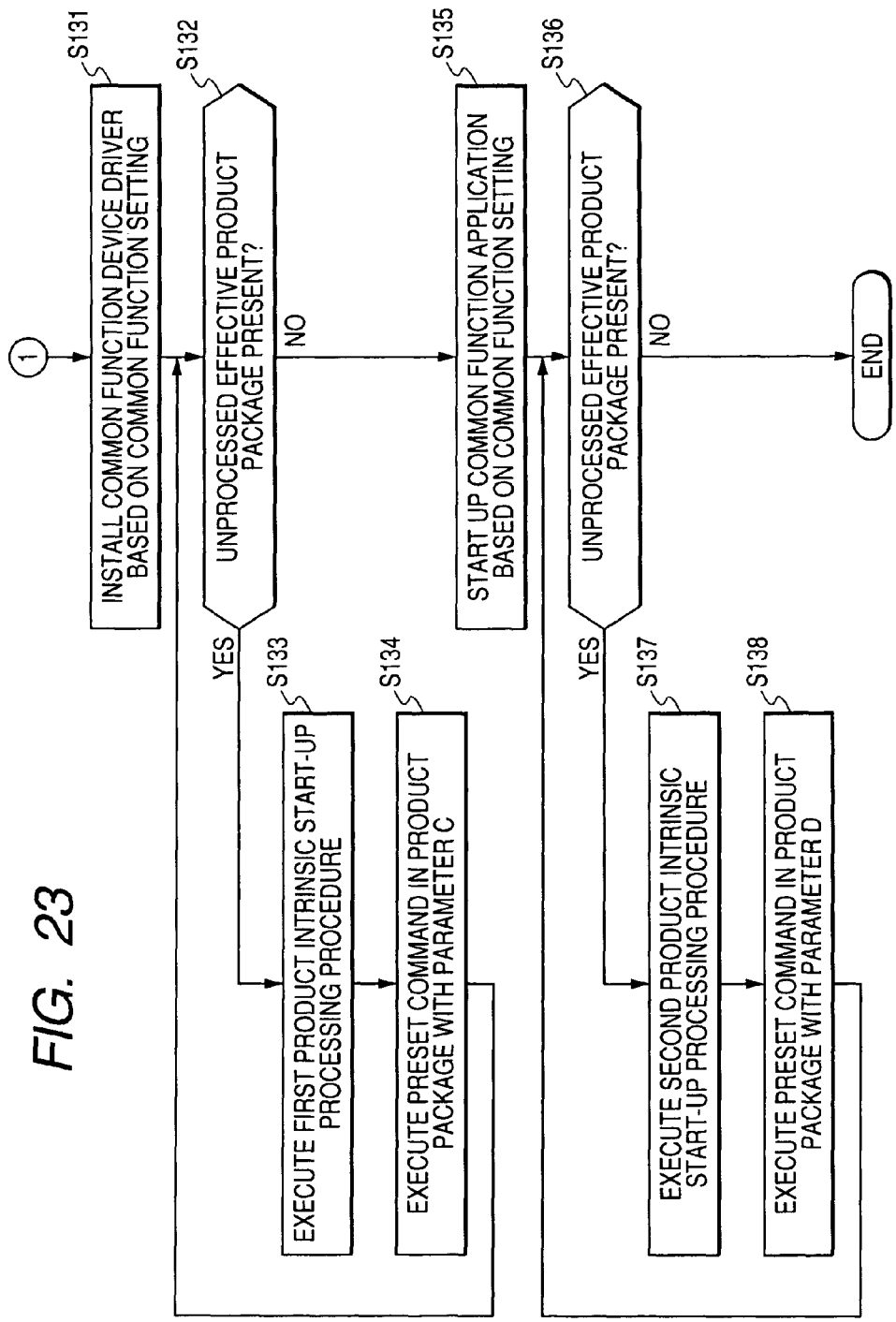
FIG. 23 is a flow chart which follows FIG. 22 for explaining the example of the flow of the system start-up processing.

Next, an example of a flow of system start-up processing which is executed by the CPU 11 having such a constitution is explained in conjunction with a flow chart shown in FIG. 22 and FIG. 23.

When the system start-up processing is started, the OS loading processing part 71 to the OS initializing processing part 73 respectively execute processing ranging from step S111 to step S113 shown in FIG. 22 in the same manner as the processing in step S1 to step S3 shown in FIG. 6.

When the processing in step S113 is finished, the OS initializing processing part 73 advances the processing to step S114. The product package loading processing part 141 executes processing in step S114 and step S115 in the same manner as the processing in step S64 and step S65 shown in FIG. 15.

When the processing in step S115 is finished, the product package loading processing part 141 advances the processing to step S116. In step S116, the preset command execution part 181 executes a preset command in the inside of the product package which becomes an object to be treated currently with a parameter A. Here, the parameter A is an arbitrary parameter and any parameter which corresponds to the executing preset command may be used as the parameter A. When the processing in step S116 is finished, the preset command execution part 181 returns the processing to step S114 and repeats the processing subsequent to step S114.

Further, when it is determined that the unprocessed effective product package is not present in step S114, the product package loading processing part 141 advances the processing to step S117. The common-function setting merging processing part 142 executes processing in step S117 and step S118 in the same manner as the processing in step S66 and step S67 shown in FIG. 15.

When the processing in step S118 is finished, the common-function setting merging processing part 142 advances the processing to step S119. In step S119, the preset command execution part 181 executes a preset command in the inside of the product package which becomes an object to be processed currently with a parameter B. Here, the parameter B is an arbitrary parameter and any parameter which corresponds to the executing preset command may be used as the parameter B. When the processing in step S119 is finished, the preset command execution part 181 returns the processing to step S117 and repeats the processing subsequent to step S117.

Further, when it is determined that the unprocessed effective product package is not present in step S117, the common-function setting merging processing part 142 advances the processing to step S120. In step S120, the common-function setting file reference part 74, in the same manner as the case in step S68 shown in FIG. 15, refers to a merged common-function setting file. When the processing is finished, the common-function setting file reference part 74 advances the processing to step S131. In step S131, the common-function device driver installing part 75, in the same manner as the processing in step S71 shown in FIG. 16, installs the common-function device driver therein based on the common-function setting and advances the processing to step S132.

The first product intrinsic start-up processing procedure execution part 143 executes processing in step S132 and step S133 in the same manner as the processing in step S72 and step S73 shown in FIG. 16. When the processing in step S133 is finished, the first product intrinsic start-up processing procedure execution part 143 advances the processing to step S134. In step S134, the preset command execution part 181 executes a preset command in the inside of the product package which becomes an object to be processed currently with a parameter C. Here, the parameter C is an arbitrary parameter and any parameter which corresponds to the executing preset command may be used as the parameter C. When the processing in step S134 is finished, the preset command execution part 181 returns the processing to step S132 and repeats the processing subsequent to step S132.

Further, when it is determined that the unprocessed effective product package is not present instep S132, the first product intrinsic start-up processing procedure execution part 143 advances the processing to step S135. In step S135, the common-function application start-up processing part 76, in the same manner as the processing in step S74 shown in FIG. 16, starts up the common-function application based on the common-function setting and advances the processing to step S136.

The second product intrinsic start-up processing procedure execution part 144 executes processing in step S136 and step S137 in the same manner as the processing in step S75 and step S76 shown in FIG. 16. When the processing in step S137 is finished, the second product intrinsic start-up processing procedure execution part 144 advances the processing to step S138. In step S138, the preset command execution part 181 executes a preset command in the inside of the product package which becomes an object to be processed currently with a parameter D. Here, the parameter D is an arbitrary parameter and any parameter which corresponds to the executing preset command may be used as the parameter D. When the processing in step S138 is finished, the preset command execution part 181 returns the processing to step S136 and repeats the processing subsequent to step S136.

Further, when it is determined that the unprocessed effective product package is not present in step S136, the second product intrinsic start-up processing procedure execution part 144 finishes the system start-up processing.

By starting up the system while executing the preset command as described above, the CPU 11 can add the processing which is not preliminarily defined by performing only installing of the product package without changing the common start-up processing such as the system software. That is, a general-purpose platform 1 can perform addition, deletion and updating of functions more safely and easily.

Further, heretofore, the explanation is made with respect to the case in which the start-up processing procedure 121 intrinsic to the product, the end processing procedure S122 intrinsic to the product, the device driver 123 intrinsic to the product, the application 124 intrinsic to the product, and the setting file 125 on the common functions are all contained in one product package. However, the invention is not limited to such a case. For example, only a setting file (passwd) on a user account administration function which is one of the setting files 125 on common functions may be contained in the setting file 125 on common functions of other product package. In this case, the general-purpose platform 1 can perform various setting more finely with respect to the respective product packages such that functions intrinsic to the product are all made effective by making two product packages, that is, the product package A and the product package B effective or only one product package B is made ineffective and only the user account setting intrinsic to the product is made ineffective (default setting in the inside of the system software is made effective) or the like.

Further, heretofore, the explanation is made with respect to the case in which the CPU 11 administrates whether the setting of each product package is effective or not using the list in which the product package setting information 43 is stored. However, the invention is not limited to such administration, and the setting of the product package may be administrated using table information shown in FIG. 24, for example.

In FIG. 24, table information 191 is table information which administrates the setting of product package (effective or ineffective) for every executing processing. For example, in FIG. 24, the table information 191 sets the setting of the product package effective or not for every executing processing with respect to each product package.

For example, in FIG. 24, with respect to the product package having the package name "pkgA" and the version number "1.0" all of the merging of the common-function setting, the execution of the first product intrinsic start-up processing procedure, and the second product intrinsic start-up processing procedure are set to "effective (ON)". Further, with respect to the product package having the package name "pkgB" and the version number "1.2", only the merging of the common-function setting is set to "effective (ON)" and both of the execution of the first product intrinsic start-up processing procedure and the second product intrinsic start-up processing procedure are set to "ineffective (OFF)". Further, with respect to the product package having the package name "pkgC" and the version number "2.0", only the merging of the common-function setting is set to "ineffective (OFF)" and both of the execution of the first product intrinsic start-up processing procedure and the second product intrinsic start-up processing procedure are set to "effective (ON)".

The constitution of the software loaded into the RAM 13 in this case is substantially equal to the constitution of the software shown in FIG. 13, and the constitution of the functional block that the CPU 11 possesses to start up the software is also substantially equal to the constitution of the functional block shown in FIG. 14.

Figure 25:
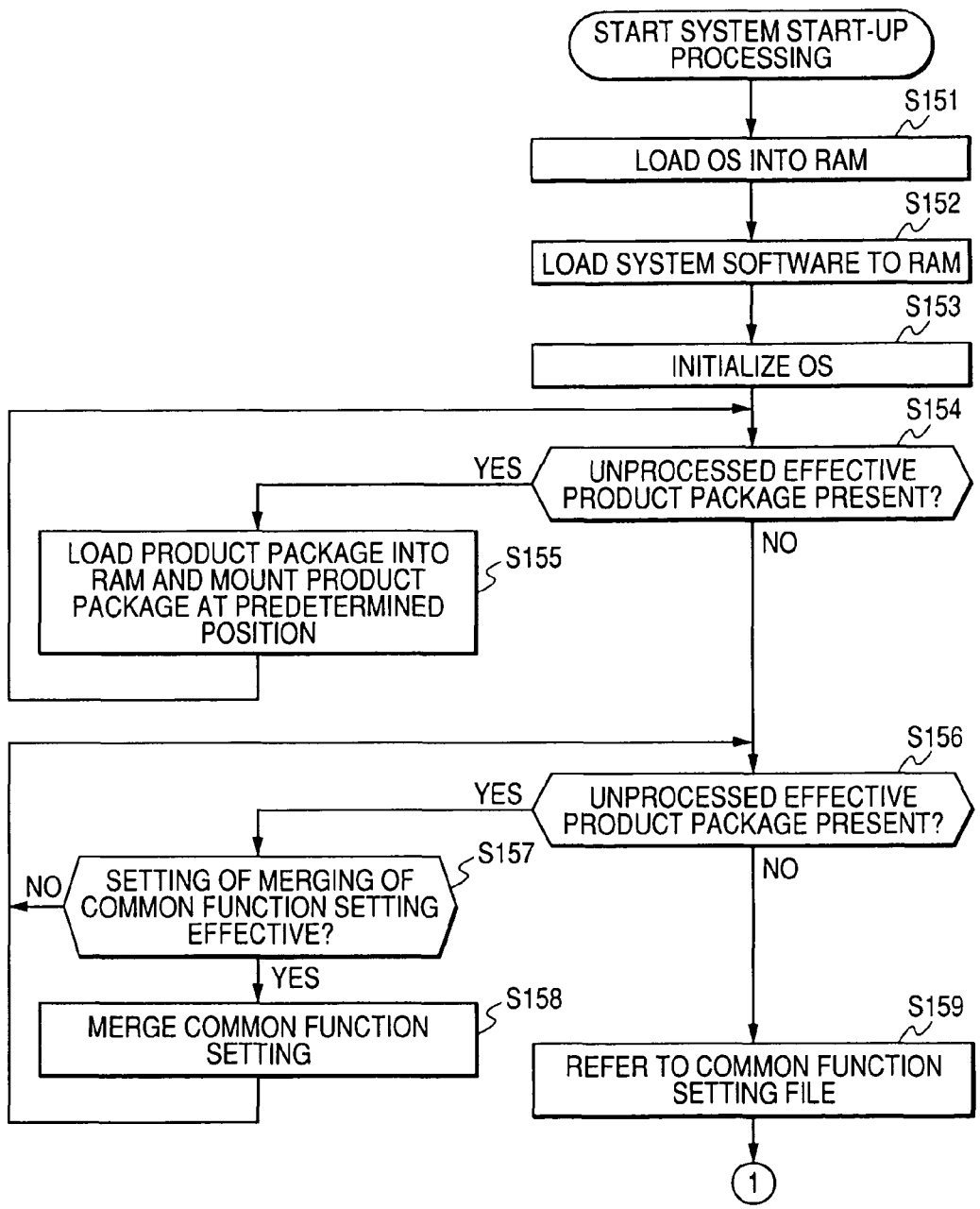
FIG. 25 is a flow chart for explaining an example of a flow of a system start-up processing.
Figure 26:
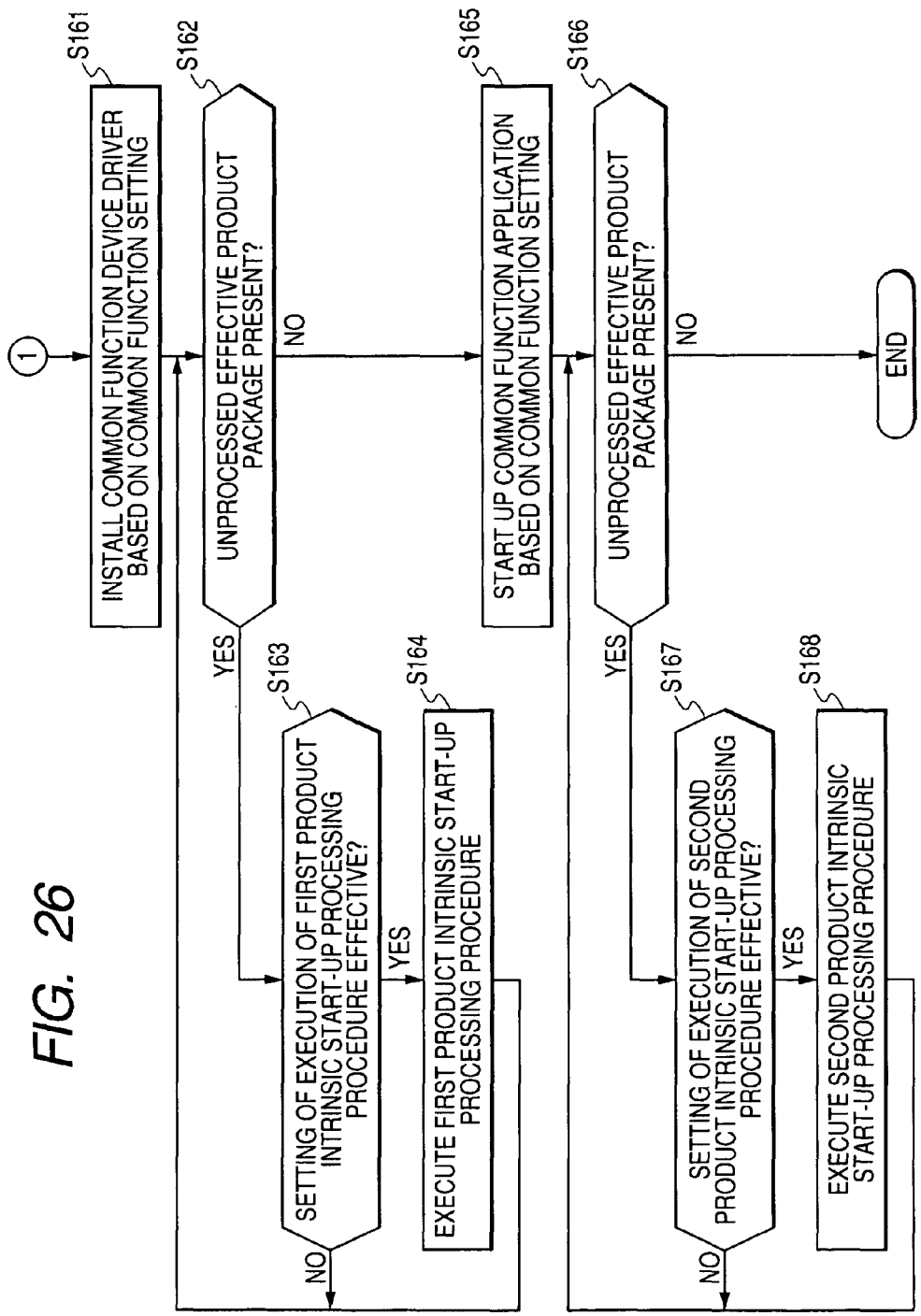
FIG. 26 is a flow chart which follows FIG. 25 for explaining the example of the flow of the system start-up processing.

That is, in the system start-up processing of this case, as expressed in a flow chart shown in FIG. 25 and FIG. 26, in step S157 shown in FIG. 25, in step S163 shown in FIG. 26 and in step S167 shown in FIG. 26, it is confirmed whether the setting of the product package is "effective" or "ineffective" with respect to the execution of the respective processings, and only when the determination is "effective", these processing are executed, while when the determination is "ineffective", these processings are omitted.

For example, the common setting merging processing part 142, in step S156 shown in FIG. 26, determines whether the product package is present in the table information 191 or not. Then, the common setting merging processing part 142, in step S157 shown in FIG. 26 refers to the table information 191 and determines whether the setting of the product package which becomes an object to be processed is effective or ineffective with respect to the merging processing of the common-function setting.

In the same manner, the first product intrinsic start-up processing procedure 143, in step S162 shown in FIG. 26, determines whether the product package is present in the table information 191 or not. Then, the first product intrinsic start-up processing procedure 143, in step S163 shown in FIG. 26 refers to the table information 191 and determines whether the setting of the product package which becomes an object to be processed is effective or ineffective with respect to the execution of the first product intrinsic start-up processing procedure.

Further, the second product intrinsic start-up processing procedure 144, in step S166 shown in FIG. 26, only determines whether the product package is present in the table information 191 or not. Then, the second product intrinsic start-up processing procedure 144, in step S167 shown in FIG. 26 refers to the table information 191 and determines whether the setting of the product package which becomes an object to be processed is effective or ineffective with respect to the execution of the second product intrinsic start-up processing procedure.

As described above, by administrating the setting of the respective product packages using the table information 191, the CPU 11 can perform the fine setting of the product package for every processing without requiring the user's input operation. Further, the CPU 11 can perform addition, deletion and changing of functions for every processing by merely updating the setting of the table information 191. That is, the general-purpose platform 1 can perform addition, deletion and updating of the functions more safely and easily.

As described above, the general-purpose platform to which the invention is applied can perform addition, deletion and updating of the functions more safely and easily. Here, the invention aims at performing at least one out of addition, deletion and updating of the functions more safely and easily and hence, provided that a plurality of software which are stored in a plurality of memory regions which are different from each other are loaded in an execution environment and, in such an execution environment, the respective software are mounted on a predetermined directories and setting files of the respective software are merged, the invention is also applicable to an information processing apparatus other than the above-mentioned general-purpose platform.

Heretofore, the explanation is made with respect to the case in which the general-purpose platform 1 acquires the software package for updating processing form the personal computer 51 which constitutes other device via the Ethernet (registered trade mark) I/F 14. However, the acquisition of the software package for updating processing is not limited to such a case. For example, as shown in FIG. 27, a general-purpose platform 201 may possess a drive 211 which corresponds to a predetermined removable media 212 and may acquire a software package recorded in the removable media 212.

That is, although the above-mentioned series of processing may be executed on hardware or may be executed on software, when the above-mentioned series of processing is executed on software, the above-mentioned software may be installed form the recording medium.

Figure 27:
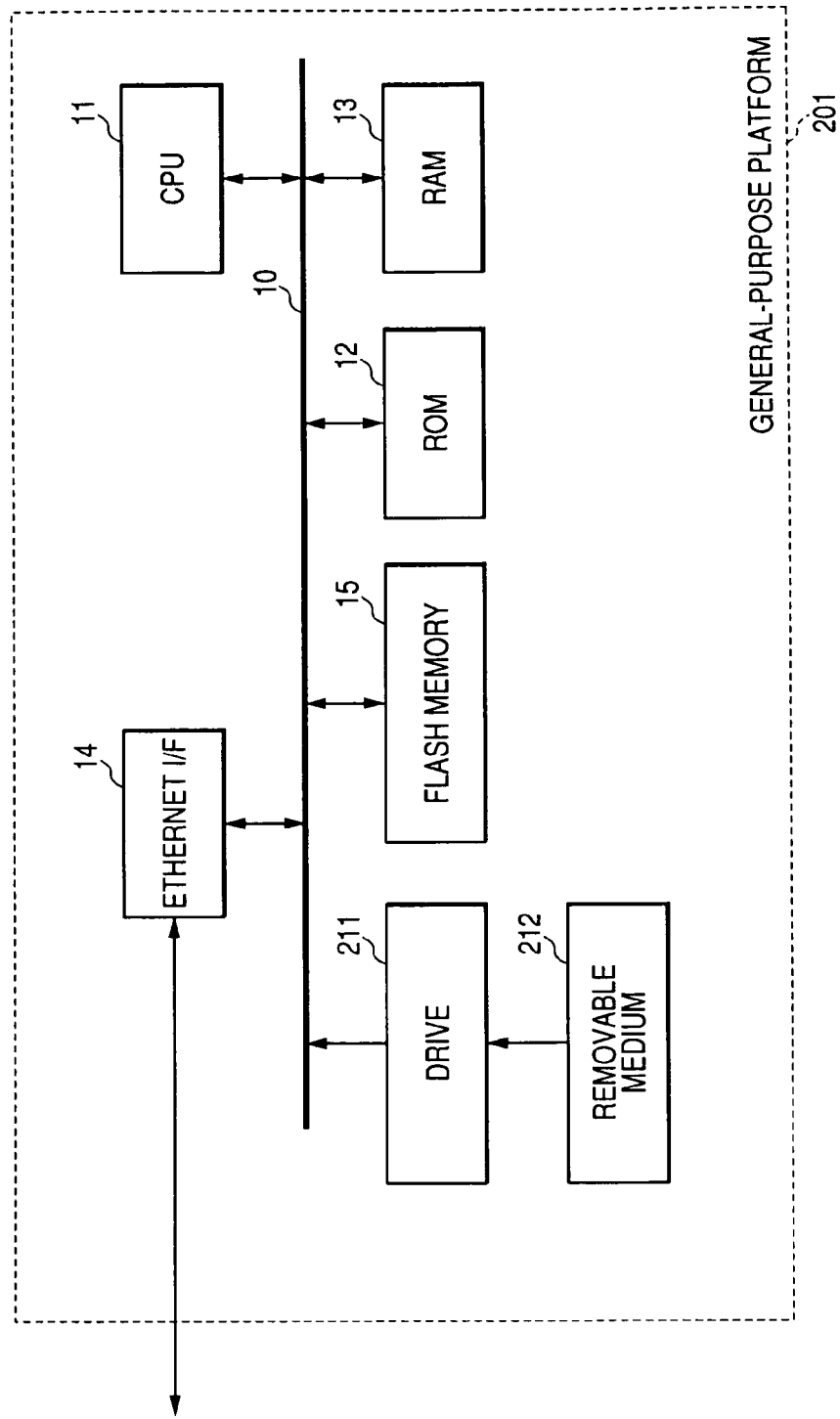
FIG. 27 is a view showing another constitutional example according to another embodiment of a general-purpose platform to which the invention is applied.

The recording medium may be, for example, as shown in FIG. 27, constituted of a removable media 212 such as a magnetic disk (including a flexible disk), an optical disk (including CD-ROM (Compact Disk-Read Only Memory), DVD (Digital Versatile Disk)), a magneto-optical disk (including MD (Mini-Disk) (registered trademark)) or a semiconductor memory in which program is recorded through which a program is distributed to a user separately from an apparatus body.

However, in this case, to prevent the general-purpose platform 201 from requiring the constitution which receives the instruction from the user, it is desirable that the CPU 11 can automatically execute the processing for reading the software package recorded in the removable media 212 which is mounted on the drive 211 (can automatically reproduce the software package recorded in the removable media 212).

Here, in this specification, the procedures for describing the program to be recorded in the recording medium includes, as a matter of cause, the processing which is sequentially performed along with the described orders, and also the processing not always performed sequentially but executed in parallel or individually.

Further, in this specification, the system implies the whole apparatus which is constituted of a plurality of apparatus. Here, the constitution which is explained as one apparatus may be divided and constituted of a plurality of devices. To the contrary, the constitution which is explained as plurality of devices may be constituted as one collective device. Further, constitutions other than the above-mentioned constitutions may be added to the constitutions of respective devices. Further, so long as the constitution and the manner of operation are substantially equal as the whole system, a portion of the constitution of a certain apparatus may be incorporated into the constitution of other apparatus.

It should not be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus which is used with diverse different devices and used while being incorporated in one of the devices and provides a predetermined function to the device in which the information processing apparatus is incorporated, the information processing apparatus comprising:

memory means for storing data;

first loading means for loading a general-purpose software which provides a general-purpose function for each of the diverse different devices to an execution environmental area and mounting the general-purpose software in a predetermined directory of the information processing apparatus at the time of starting up a system;

second loading means for loading a dedicated software which provides a function intrinsic to the device to the execution environmental area and mounting the dedicated software in a predetermined directory of the information processing apparatus at the time of starting up a system; and integrating means for integrating a first setting file containing general-purpose setting information which is included in the general-purpose software which is loaded by the first loading means and a second setting file containing general-purpose setting information which is included in the dedicated software which is loaded by the second loading means and reflects the presence of the dedicated software, wherein the diverse different devices include an audio/video equipment, a refrigerator, a washing machine, a broadcasting facility, a traffic administration system, and an automobile, and wherein the general-purpose function provided by the general-purpose software remains the same for all of the diverse different devices, wherein constitutions of the general-purpose software remain the same when a dedicated software intrinsic to the device is added or updated, and the general-purpose software further updates the first setting file, wherein the memory means stores product setting information indicating that a dedicated software intrinsic to the device, which is stored in the memory means but is not mounted until a next system start-up time, is made effective at the next system start-up time, the product setting information including the dedicated software's file name that includes a product package name and a version number as setting information, and wherein the second setting file includes a log setting file associated with a system logging function and an account setting file associated with a user account management function, and the second setting file indicates an updating portion of the first setting file, and wherein both the first setting file and the second setting file are stored in a same flash memory of the memory means of the information processing apparatus, and wherein software for receiving manipulations related to a keyboard and a display is excluded from the information processing apparatus and is excluded from the general-purpose software and from the dedicated software, and wherein the information processing apparatus performs addition, deletion, and updating of product packages of the dedicated software without updating an operating system of the information processing apparatus.

2. An information processing apparatus according to claim 1, wherein the information processing apparatus further stores the general-purpose software and the dedicated software in a memory region which differs from the execution environmental area.

3. An information processing apparatus according to claim 2, wherein the memory means stores the general-purpose software and the dedicated software in memory regions which differ from each other.

4. An information processing apparatus according to claim 1, wherein the information processing apparatus further includes setting information memory means for storing setting information for setting a function of the dedicated software effective or ineffective, and the second loading means, loads the dedicated software whose function is set to be effective in the setting information stored in the setting information memory means to the execution environmental area and mounts the dedicated software in a predetermined directory.

5. An information processing apparatus according to claim 4, wherein the information processing apparatus further includes updating instruction acquisition means for acquiring updating instruction for updating a content of the setting information stored in the setting information memory means, and updating means for updating the content of the setting information based on the updating instruction acquired by the updating instruction acquisition means.

6. An information processing apparatus according to claim 4, wherein the setting information includes a list indicative of effective dedicated software.

7. An information processing apparatus according to claim 4, wherein the setting information includes table information indicative of setting for every start-up processing of the dedicated software whose function is effective.

8. An information processing apparatus according to claim 1, wherein the information processing apparatus further includes command execution means which executes a command contained in the dedicated software which is loaded and mounted by the second loading means at the time of starting up the system.

9. An information processing method of an information processing apparatus which is used with diverse different devices and used while being incorporated in one of the devices and provides a predetermined function to the device in which the information processing apparatus is incorporated, the information processing method comprising the steps of:

loading a general-purpose software which provides a general-purpose function for each of the diverse different devices to an execution environmental area and mounting the general-purpose software in a predetermined directory of the information processing apparatus at the time of starting up a system;

loading a dedicated software which provides a function intrinsic to the device to an execution environmental area and mounting the dedicated software in a predetermined directory of the information processing apparatus at the time of starting up a system; and integrating a first setting file containing general-purpose setting information which is included in the general-purpose software which is loaded and a second setting file containing general-purpose setting information which is included in the dedicated software which is loaded and reflects the presence of the dedicated software in the execution environmental area, and storing both the first setting file and the second setting file in a same flash memory of memory means of the information processing apparatus, and wherein the diverse different devices include an audio/video equipment, a refrigerator, a washing machine, a broadcasting facility, a traffic administration system, and an automobile, and wherein the general-purpose function provided by the general-purpose software remains the same for all of the diverse different devices, wherein constitutions of the general-purpose software remain the same when a dedicated software intrinsic to the device is added or updated, and the general-purpose software further updates the first setting file, wherein the information processing method further stores product setting information indicating that a dedicated software intrinsic to the device, which is stored in the memory means but is not mounted until a next system start-up time, is made effective at the next system start-up time, the product setting information including the dedicated software's file name that includes a product package name and a version number as setting information, and wherein the second setting file includes a log setting file associated with a system logging function and an account setting file associated with a user account management function, and the second setting file indicates an updating portion of the first setting file, and wherein steps for receiving manipulations related to a keyboard and a display are excluded from the information processing method and are not performed by the general-purpose software and not by the dedicated software, and wherein the information processing method performs addition, deletion, and updating of product packages of the dedicated software without updating an operating system of the information processing apparatus.

10. A non-transitory storing medium storing a program which allows a computer processor integrated into an information processing apparatus which is used with diverse different devices and used while being incorporated in one of the devices and provides a predetermined function to the device in which the program is incorporated, the program comprising the steps of:

loading a general-purpose software which provides a general-purpose function for each of the diverse different devices to an execution environmental area and mounting the general-purpose software in a predetermined directory of the information processing apparatus at the time of starting up a system;

loading a dedicated software which provides a function intrinsic to the device to the execution environmental area and mounting the dedicated software in a predetermined directory of the information processing apparatus at the time of starting up a system; and integrating a first setting file containing general-purpose setting information which is included in the general-purpose software which is loaded and a second setting file containing general-purpose setting information which is included in the dedicated software which is loaded and reflects the presence of the dedicated software in the execution environmental area, and storing both the first setting file and the second setting file in a same flash memory of memory means of the computer, and wherein the diverse different devices include an audio/video equipment, a refrigerator, a washing machine, a broadcasting facility, a traffic administration system, and an automobile, and wherein the general-purpose function provided by the general-purpose software remains the same for all of the diverse different devices, wherein constitutions of the general-purpose software remain the same when a dedicated software intrinsic to the device is added or updated, and the general-purpose software further updates the first setting file, wherein the medium further stores product setting information indicating that a dedicated software intrinsic to the device, which is stored in the memory means but is not mounted until a next system start-up time, is made effective at the next system start-up time, the product setting information including the dedicated software's file name that includes a product package name and a version number as setting information, and the second setting file indicates an updating portion of the first setting file, and wherein the second setting file includes a log setting file associated with a system logging function and an account setting file associated with a user account management function, and wherein steps for receiving manipulations related to a keyboard and a display are excluded from the program and are excluded from the general-purpose software and from the dedicated software, and wherein the program performs addition, deletion, and updating of product packages of the dedicated software without updating an operating system of the information processing apparatus.

11. An information processing apparatus which is used with diverse different devices and used while being incorporated in one of the devices and provides a predetermined function to the device in which the information processing apparatus is incorporated, the information processing apparatus comprising:

a memory part that stores data;

a first loading part which loads general-purpose software which provides a general-purpose function for each of the diverse different devices to an execution environmental area and mounts the general-purpose software in a predetermined directory of the information processing apparatus at the time of starting up a system;

a second loading part which loads a dedicated software which provides a function intrinsic to the device to the execution environmental area and mounts the dedicated software in a predetermined directory of the information processing apparatus at the time of starting up a system; and an integrating part which integrates a first setting file containing general-purpose setting information which is included in the general-purpose software which is loaded by the first loading part and a second setting file containing general-purpose setting information which is included in the dedicated software which is loaded by the second loading part and reflects the presence of the dedicated software, wherein the diverse different devices include an audio/video equipment, a refrigerator, a washing machine, a broadcasting facility, a traffic administration system, and an automobile, and wherein the general-purpose function provided by the general-purpose software remains the same for all of the diverse different devices, wherein the memory part include a flash memory that stores both the first setting file and the second setting file, and wherein constitutions of the general-purpose software remain the same when a dedicated software intrinsic to the device is added or updated, and the general-purpose software further updates the first setting file, wherein the memory part stores product setting information indicating that a dedicated software intrinsic to the device, which is stored in the memory part but is not mounted until a next system start-up time, is made effective at the next system start-up time, the product setting information including the dedicated software's file name that includes a product package name and a version number as setting information, and the second setting file indicates an updating portion of the first setting file, and wherein the second setting file includes a log setting file associated with a system logging function and an account setting file associated with a user account management function, and wherein software for receiving manipulations related to a keyboard and a display is excluded from the information processing apparatus and is excluded from the general-purpose software and from the dedicated software, and wherein the information processing apparatus performs addition, deletion, and updating of product packages of the dedicated software without updating an operating system of the information processing apparatus.

* * * * *